(12) United States Patent
Tochio

(10) Patent No.: US 8,737,201 B2
(45) Date of Patent: May 27, 2014

(54) DATA RELAY APPARATUS, AND RING-TYPE COMMUNICATION SYSTEM

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 12/923,172

(22) Filed: Sep. 7, 2010

(65) Prior Publication Data

US 2011/0063971 A1 Mar. 17, 2011

(30) Foreign Application Priority Data

Sep. 16, 2009 (JP) .................................. 2009-213892

(51) Int. Cl.
*H04L 12/26* (2006.01)

(52) U.S. Cl.
USPC .......................................... 370/225; 370/242

(58) Field of Classification Search
None
See application file for complete search history.

(56) References Cited

U.S. PATENT DOCUMENTS

| | | | |
|---|---|---|---|
| 6,144,633 A | 11/2000 | Ikeda et al. | |
| 6,625,115 B1 | 9/2003 | Ikeda et al. | |
| 7,518,988 B2 | 4/2009 | Sekihata | |
| 7,636,299 B2 | 12/2009 | Asa et al. | |
| 7,751,335 B2 * | 7/2010 | Miyazaki | 370/244 |
| 7,843,812 B2 * | 11/2010 | Kobatake | 370/222 |
| 2007/0263660 A1 * | 11/2007 | Mitsumori | 370/469 |
| 2009/0147675 A1 | 6/2009 | Sekihata | |
| 2009/0274044 A1 * | 11/2009 | Goose et al. | 370/225 |
| 2009/0310483 A1 * | 12/2009 | Okazaki | 370/228 |
| 2010/0208584 A1 * | 8/2010 | Sone et al. | 370/228 |
| 2011/0007628 A1 * | 1/2011 | Tochio | 370/224 |

FOREIGN PATENT DOCUMENTS

| | | |
|---|---|---|
| AD | 2006-270169 | 10/2006 |
| AE | 2006-203919 | 8/2006 |
| AF | 10-117175 | 5/1998 |
| JP | 2004-147172 | 5/2004 |
| JP | 2007-174119 | 7/2007 |
| WO | WO 2008/068813 | 6/2008 |

OTHER PUBLICATIONS

Series G: Transmission Systems and Media, Digital Systems and Networks: Packet Over Transport Aspects—Ethernet Over Transport Aspects, Series Y: Global Information Infrastructure, Internet Protocol Aspects and Next-Generation Networks: Internet Protocol Aspects—Transport, "Ethernet Ring Protection Switching," International Telecommunication Union, Jun. 2008, 44pp, http://www.itu.int/rec/T-REC-G.8032.

Patent Abstracts of Japan, Publication No. 2006-203919, Published Aug. 3, 2006.

Japanese Patent Office Action dated Aug. 13, 2013 issued in Japanese Patent Application No. 2009-213892.

* cited by examiner

*Primary Examiner* — Anh-Vu Ly

(74) *Attorney, Agent, or Firm* — Staas & Halsey LLP

(57) ABSTRACT

A data relay apparatus for data relay in a ring-type network for data including a path identifier which is transferred according to the path identifier, receives the data; stores the path identifier that is used to determine a data path in which the data is transferred in the ring-type communication network in association with a reception direction and a transmission direction of the data; compares the path identifier included in the received data and the path identifier stored by an information storing part to determine a path for receiving and transmitting the data and switches the transmission direction of the data based on a reception direction of a failure notification message notified when a communication failure occurs and whether a switching inhibition message transmitted concerning the communication failure is received; and transmits the data in the switched transmission direction.

11 Claims, 29 Drawing Sheets

FIG.4

| VLAN ID (VID) | DESTINATION ADDRESS | USUAL PATH RESERVE PATH | RECEPTION DIRECTION | TRANSMISSION DIRECTION |
|---|---|---|---|---|
| A | X | USUAL PATH | T DIRECTION | W DIRECTION |
| A | X | RESERVE PATH | T DIRECTION | E DIRECTION |
| B | Y | USUAL PATH | E DIRECTION | W DIRECTION |
| C | Z | RESERVE PATH | W DIRECTION | E DIRECTION |

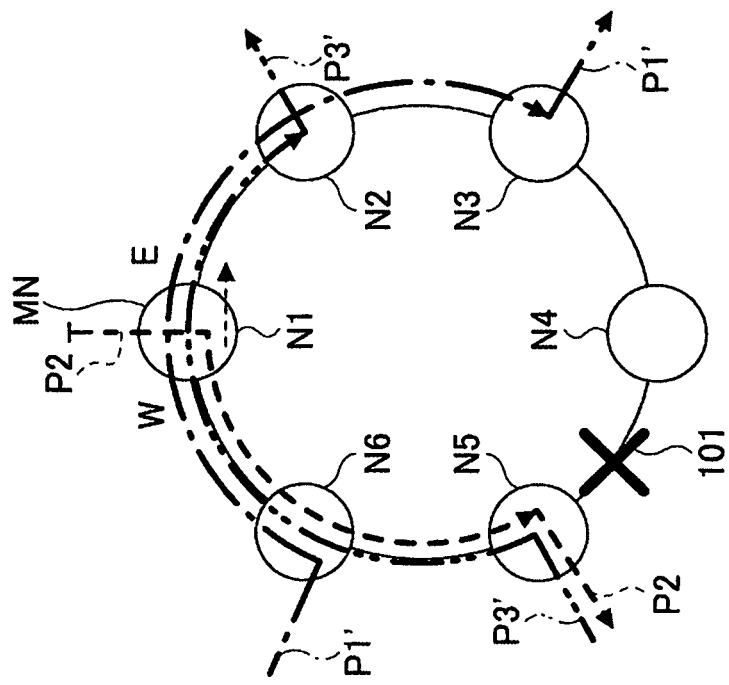
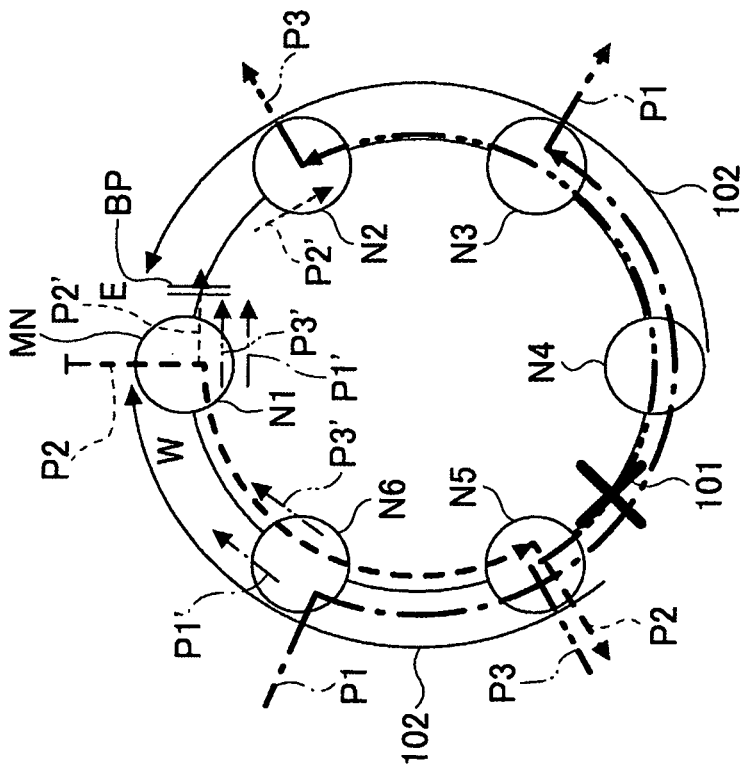
FIG.5B
FIG.5A

AFTER FIXED TIME

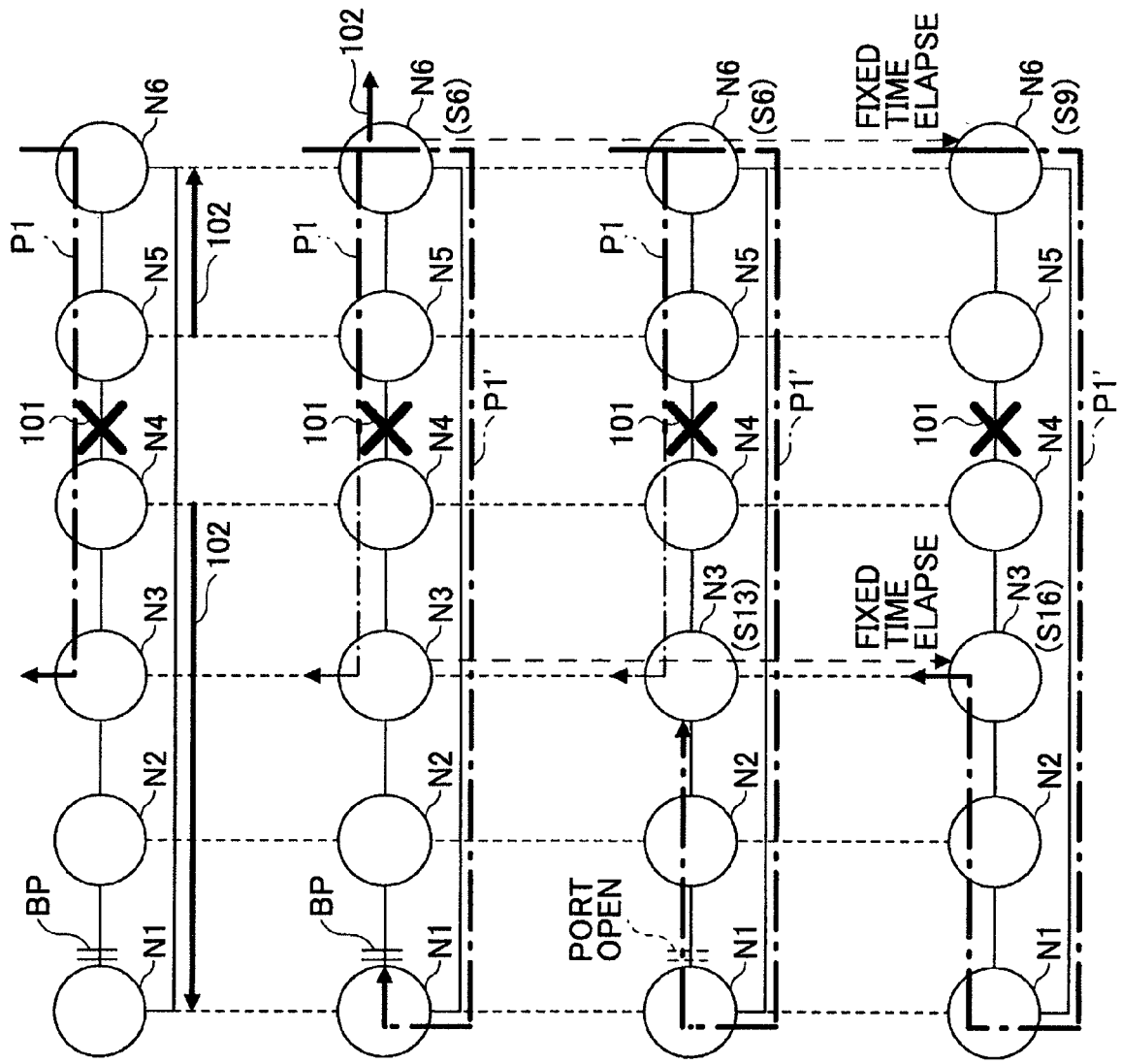

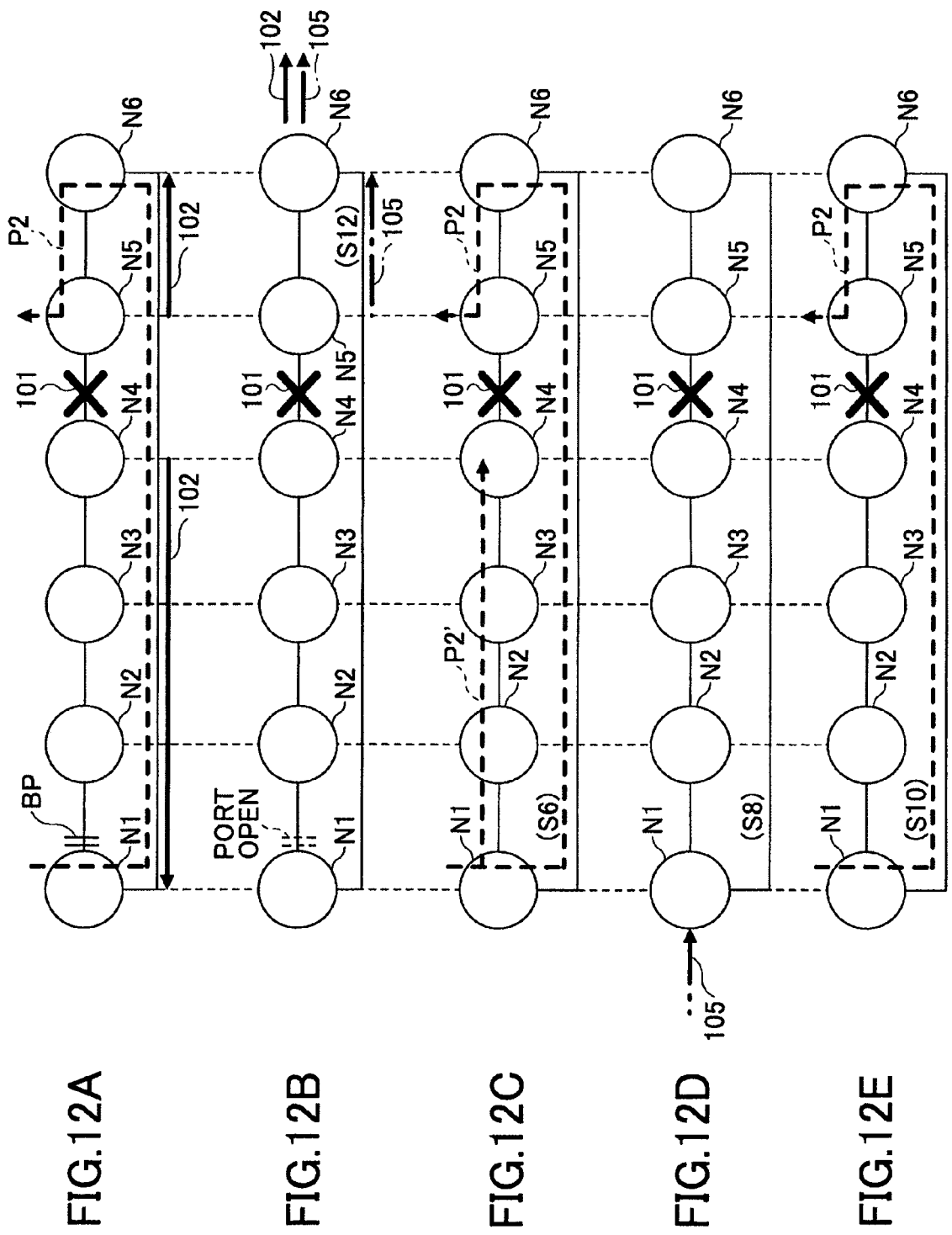

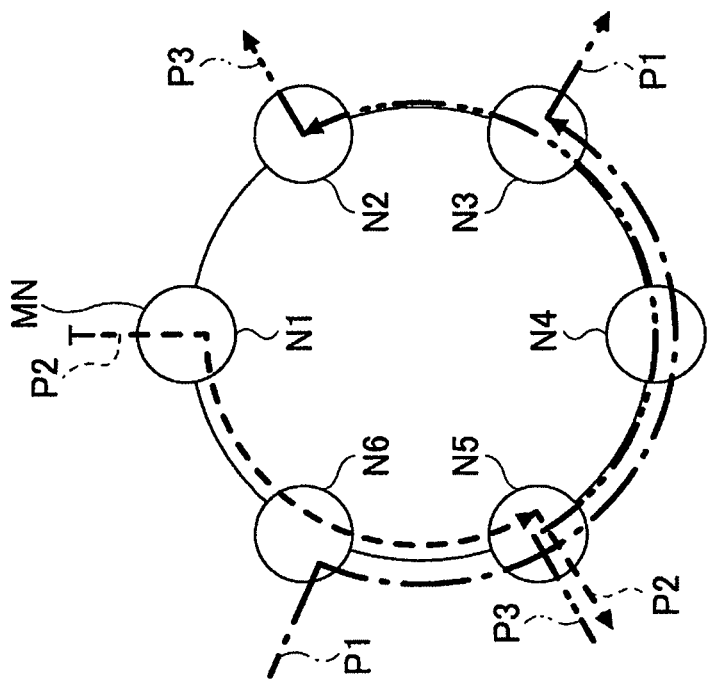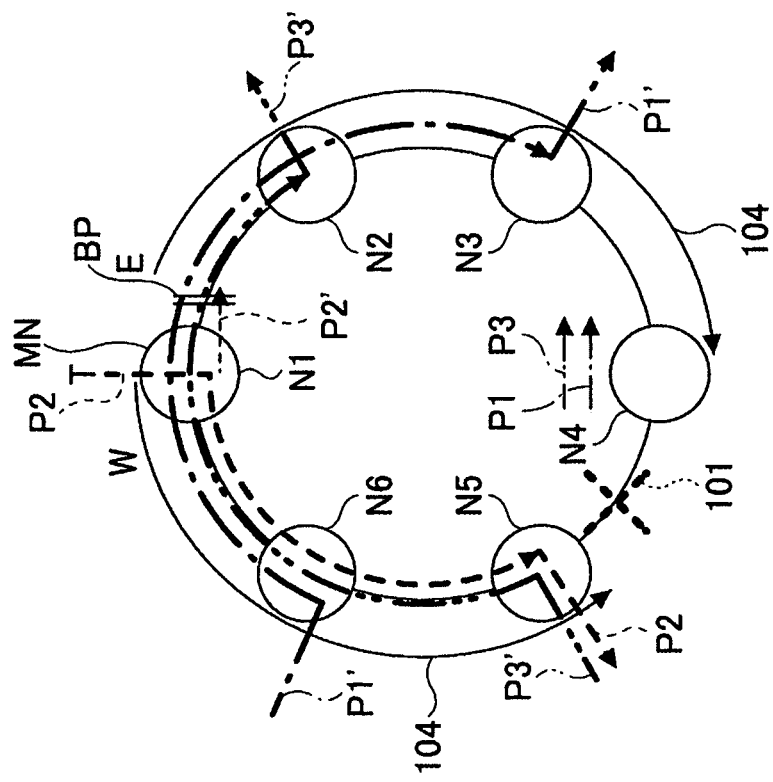

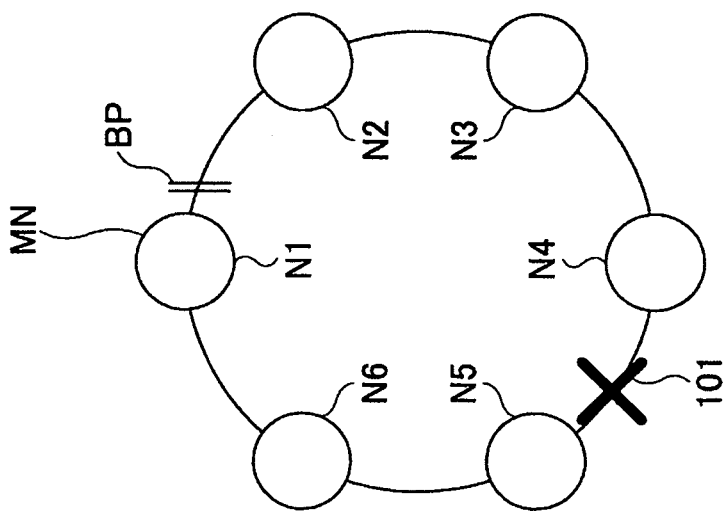
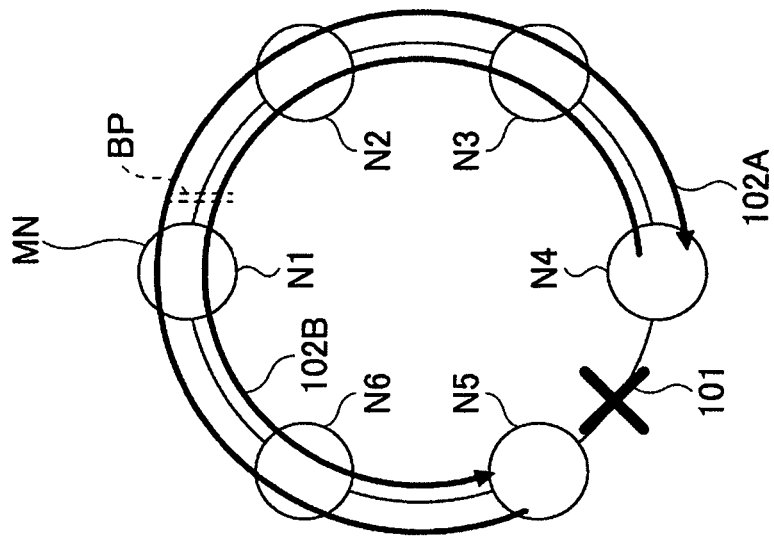

FIG.22A

| NODE NUMBER | USUAL PATH RESERVE PATH | | RECEPTION DIRECTION | TRANSMISSION DIRECTION |
|---|---|---|---|---|
| 5A (VID=A) (STARTING-POINT NODE) | USUAL PATH | | T DIRECTION | W DIRECTION |
| 5A (VID=A) (STARTING-POINT NODE) | RESERVE PATH | ① | T DIRECTION | E DIRECTION |
| | | ② | T DIRECTION | E/W DIRECTION |
| 4 (ENDING-POINT NODE) | USUAL PATH | | E DIRECTION | T/W DIRECTION |
| 4 (ENDING-POINT NODE) | RESERVE PATH | | W/E DIRECTION | T/E DIRECTION |
| 2 (ENDING-POINT NODE) | USUAL PATH | | E DIRECTION | T DIRECTION |
| 2 (ENDING-POINT NODE) | RESERVE PATH | | W DIRECTION | T/E DIRECTION |

FIG.22B

| NODE NUMBER | USUAL PATH RESERVE PATH | | RECEPTION DIRECTION | TRANSMISSION DIRECTION |
|---|---|---|---|---|
| 5B (VID=B) (STARTING-POINT NODE) | USUAL PATH | | T DIRECTION | E DIRECTION |
| 5B (VID=B) (STARTING-POINT NODE) | RESERVE PATH | ① | T DIRECTION | W DIRECTION |
| | | ② | T DIRECTION | E/W DIRECTION |
| 6B (VID=B) (ENDING-POINT NODE) | USUAL PATH | | W DIRECTION | T DIRECTION |
| | RESERVE PATH | | E DIRECTION | T DIRECTION |

DATA RELAY APPARATUS, AND RING-TYPE COMMUNICATION SYSTEM

CROSS-REFERENCE TO RELATED APPLICATIONS

This application is based upon and claims the benefit of priority of Japanese Patent Application No. 2009-213892, filed on Sep. 16, 2009, the entire contents of which are incorporated herein by reference.

FIELD

The embodiment discussed herein is directed to a data relay apparatus, and a ring-type communication system, in which, in response to a failure occurring in a data transmission path formed in a ring shape, the data transmission path is switched.

BACKGROUND

A technology of transmitting data via a ring-type communication system that is formed in a ring shape by using a technology such as Ethernet (registered trademark) is known. The data means a frame in the Ethernet. In the ring-type communication system, in order to make it possible to maintain data transmission even at a time of occurrence of a failure, a redundancy is provided for a data transmission path. Further, for a technology to recover from a failure in the ring-type communication system, it is demanded that an interruption time in which data transmission is not available be reduced, without requiring an operator's work.

As the technology to recover from a failure, a technology to transfer (transmit) failure detection information at a time of failure detection, and a technology to set and cancel a blocking state in the ring-shape communication system are known. Further, as a technology to recover from a failure for the ring-type communication system, a ring-protection method according to ITU-T (International Telecommunication Union Telecommunication Standardization Sector) recommendation G.8032 is known. The ring-protection method is a method specialized for the ring-type communication system, and is a method that is a technology to recover from a failure at higher speed than STP (Spanning Tree Protocol). Frames that are targets of protection according to the ring-protection method are used in communications without establishing a connection.

The ring-type communication system employing the ring-protection method has, as will be described with reference to FIG. 26A, a master node (referred to as MN in the figures) N1. A blocking port BP is set to the master node N1 for avoiding a loop of data.

In the ring-type communication system, when a failure 101 occurs between a node N5 and a node N4 for example, the node N5 and the node N4 transmit failure notification messages 102, as depicted in FIG. 26B. When receiving the failure notification messages 102, the master node N1 opens the blocking port BP. Thus, the ring-type communication system provides redundancy such that, even at a time of an occurrence of a failure, the communications can be continued.

As depicted in FIG. 26C, when a recovery is made from the failure 101, the node N4 and the node N5 transmit recovery notification messages 103. When receiving the recovery notification messages 103, the master node N1 sets the blocking port BP again as depicted in FIG. 26D, and transmits, to the other nodes N2 through N6, re-setting notification messages.

It is noted that, with reference to FIGS. 26A through 26D, description has been made assuming that the number of nodes is 6, as N1 through N6. However, the ring-type communication system may be such that the number of nodes is equal to or more than 6, or less than 6.

Japanese Laid-Open Patent Applications Nos. 2004-147172 and 2007-174119, and "http://www.itu.int/rec/T-REC-G.8032" disclose related art.

SUMMARY

In the embodiment, a data relay apparatus that carries out data relay in a ring-type network in which data that includes a path identifier and is transferred according to the path identifier exists, includes a receiving part that receives the data; an information storing part that stores the path identifier that is used to determine a data path in which the data is transferred in the ring-type communication network in a manner in which the path identifier is associated with a reception direction and a transmission direction of the data; a switching part that compares the path identifier included in the received data and the path identifier stored by the information storing part, determines a path in which the data is to be received and transmitted and switches the transmission direction of the data based on a reception direction of a failure notification message that is received when a communication failure occurs and whether a switching inhibition message that is transmitted concerning the communication failure is received; and a transmission part that transmits the data in the transmission direction that is switched by the switching part.

In the embodiment, a ring-type communication system is such that a block point is provided by a master node for avoiding a loop of data at a part of a ring-type communication path including plural nodes, a failure notification message is transmitted at a time of an occurrence of a communication failure and the block point is opened; then, the master node transmits a re-setting notification message at a time of a recovery from the communication failure and the block point is set again. In the ring-type communication system, the data relayed between the nodes includes a path identifier that is used to determine a data path in the ring-type communication path; each node reads the path identifier, and determines a path in which the data is to be transferred in the ring-type communication path.

It is to be understood that both the foregoing general description and the following detailed description are exemplary and explanatory only and are not restrictive of the invention as claimed.

BRIEF DESCRIPTION OF DRAWINGS

FIG. 4 depicts one example of a forwarding table stored by a node N5 depicted in FIG. 3 in the ring-type communication system in the embodiment of the present invention;

FIGS. 5A and 5B are system diagrams illustrating operations of switching a path for when a failure notification message is transmitted in the ring-type communication system in the embodiment of the present invention;

FIGS. 11A, 11B, 11C and 11D illustrate operations for when a communication path is switched to a reserve path in the ring-type communication system in the embodiment of the present invention;

FIGS. 12A, 12B, 12C, 12D and 12E illustrate operations for when a communication path that is a usual path is maintained as it is in the ring-type communication system in the embodiment of the present invention;

FIGS. 14A and 14B are system diagrams illustrating operations for when a re-setting notification message is transmitted in the ring-type communication system in the embodiment of the present invention;

FIGS. 16A and 16B are system diagrams illustrating operations of receiving a failure notification message plural times and switching a communication path in the ring-type communication system in the embodiment of the present invention;

FIGS. 22A and 22B illustrate forwarding tables stored by each node in the ring-type communication system in the embodiment of the present invention

DESCRIPTION OF EMBODIMENT

In recent transmission technology employing Ethernet, the technology takes notice that a VLAN (Virtual LAN) identifier or a combination of a VLAN identifier and a MAC (Media Access Control) address is interpreted as an end-to-end path identifier, and a frame is transmitted. In a case where this technology is used, a node that relays a frame carries out switching in such a manner that a VLAN identifier or a combination of a VLAN identifier and a MAC address is regarded as a path identifier. Therefore, each node need not carry out address learning.

According to this technology, a connection is identified and a frame is transmitted even though the Ethernet is used. However, when a path identified by a VLAN identifier or a combination of a VLAN identifier and a MAC address is set, a problem occurs when the above-mentioned ring-protection method is used.

Figure 27:
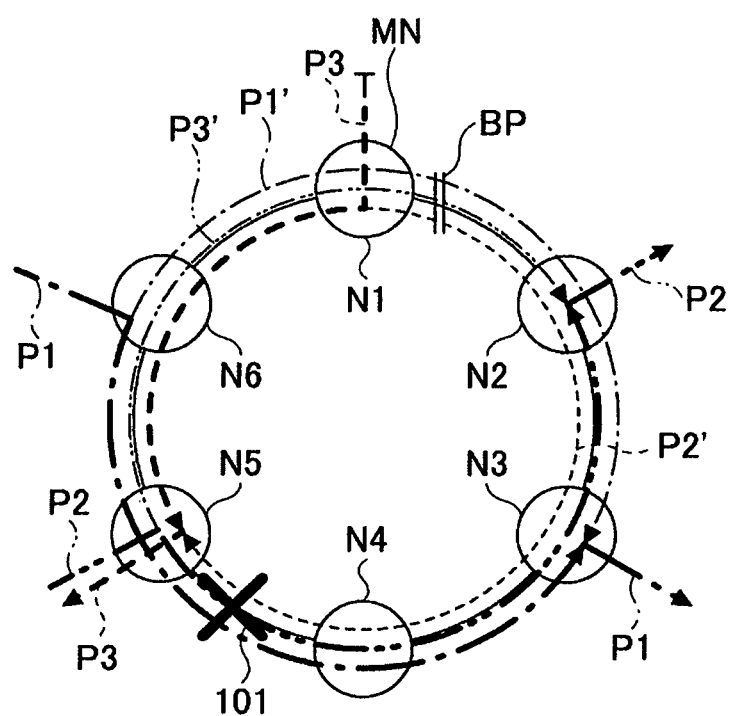
FIG. 27 is a system diagram illustrating a relationship between a reserve path and a blocking port.

As depicted in FIG. 27, a redundancy path is formed in a ring-type communication system for a path P1 that transmits data received by a node N6 to a node N3 via a node N5 and a node N4, for example. For this purpose, a path P1' is formed which transmits the data to the node N3 via a master node N1 and a node N2 from the node N6. However, the path P1' includes the master node N1. Therefore, in a case where a blocking port BP is set by the master node N1, setting and definition of a connection as the reserve path P1' cannot be carried out.

Therefore, in a case where the technology of realizing a path by using a VLAN identifier or a combination of a VLAN identifier and a MAC address is used in a ring-type communication system, a redundancy path may not be used when a failure is detected because a reserve path cannot be set. Further, the same problem occurs also in a case where a reserve path P3' is set for another path P3.

The embodiment of the present invention has been proposed in consideration of the above-mentioned problem, and an object of the embodiment is to provide a data relay apparatus and a ring-type communication system in which, even when traffic that relays data by using a path identifier is included in the ring-type communication system, communications can be carried out by using a reserve path when a failure occurs.

The data relay apparatus in the embodiment maintains or switches a transmission direction of data in accordance with a path that transmits the data when a communication failure is detected in a ring-type communication path. Thus, stable communications are available.

In the ring-type communication system in the embodiment, data relayed between nodes includes a path identifier that is used to determine a data path in a ring-type communication path, and each node reads the path identifier and determines a path to transfer data in the ring-type communication path. Therefore, it is possible identify a reserve path by using the path identifier and carry out communications when a failure occurs.

Below, the embodiment of the present invention will be described with reference to figures.

[Description of Ring-Type Communication System]

Figure 1:
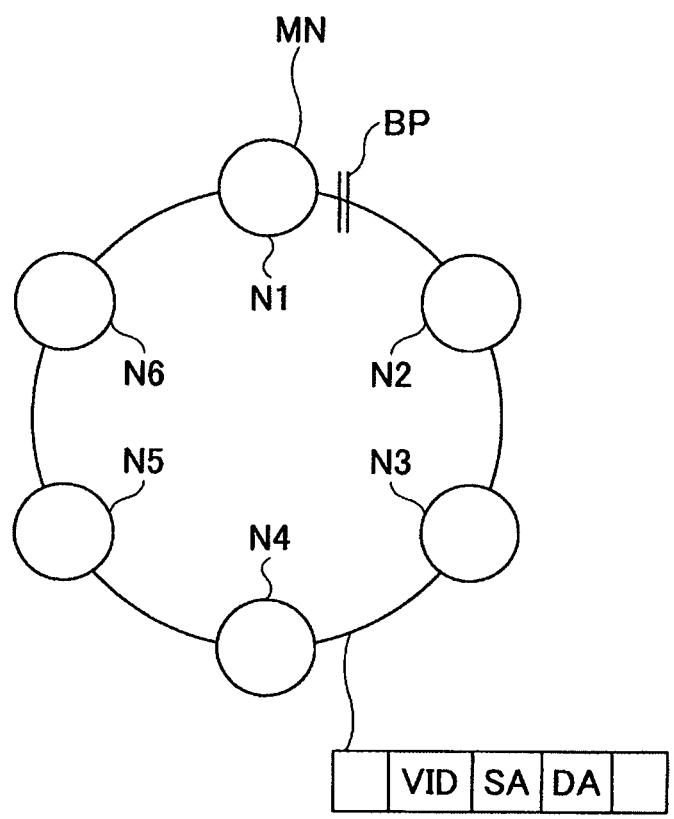
FIG. 1 is a system diagram depicting a configuration of a ring-type communication system in one embodiment of the present invention.

A ring-type communication system according to the embodiment of the present invention has, for example, plural nodes N1 through N6 that are connected together to be like a ring using a ring-type communication path as depicted in FIG. 1. Each of the nodes N1, N2, N3, N4, N5 and N6 (hereinafter, also simply referred to as a "node 1" for the purpose of generalizing) functions as a data relay apparatus that relays data received from an adjacent node.

The nodes N1, N2, N3, N4, N5 and N6 in the ring-type communication system transmit frame data by using, for example, a data transmission technology called Ethernet (registered trademark). It is noted that, in the description below, data transmitted in a path that is set is referred to as "frame data". The frame data includes a data body (main signal), a VLAN ID (also referred to as VID) as a path identifier, a MAC address as a transmission source address and a MAC address as a transmission destination address. VID is read by the nodes N1, N2, N3, N4, N5 and N6 as information that is used to determine a data path (communication path) in the ring-type communication system.

Further, in the ring-type communication system, control data including a failure notification and a failure recovery notification is transmitted when a failure occurs in the ring-type communication system. Operations including those of a failure notification and a failure recovery notification may use a ring-protection method according to the ITU-T recommendation G.8032. The control data transmitted when a failure occurs is ring-protection control frames. The ring-protection control frames include a failure notification message 102, a recovery notification message 103, a re-setting notification message 104 and a switching inhibition message 105 that will be described later.

In the ring-type communication system, in order to avoid a loop of frame data, the node N1, for example, of the nodes N1, N2, N3, N4, N5 and N6 is set as a master node (MN) (hereinafter referred to as a master node N1). In the master node N1, in an ordinary occasion in which no communication failure occurs, a port on the side of the node N2, of ports that the master node N1 has, is set as a blocking port (blocking point) BP that blocks data. The blocking port BP is provided at a part of the ring-type communication path for the purpose of avoiding a loop of data. Therefore, frame data (main signal) transmitted to the blocking port BP of the master node N1 is blocked by the blocking port BP.

Figure 2A:
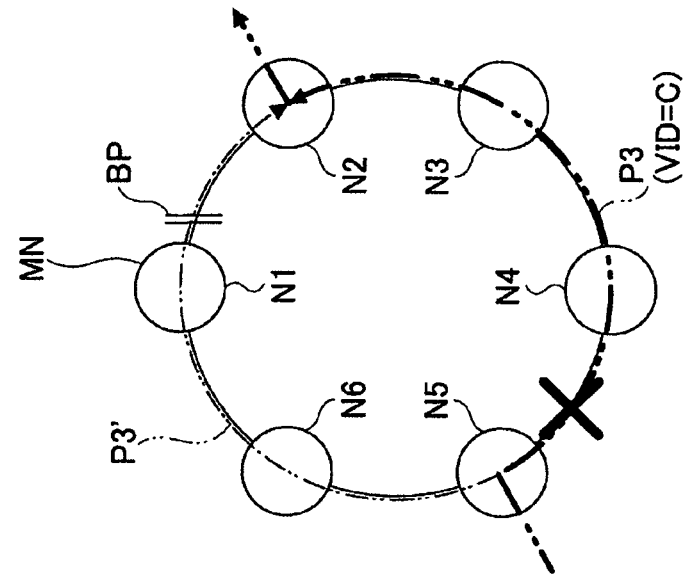
FIGS. 2A, 2B and 2C are system diagrams depicting a usual path and a reserve path that are set in the ring-type communication system in the embodiment of the present invention.
Figure 2B:
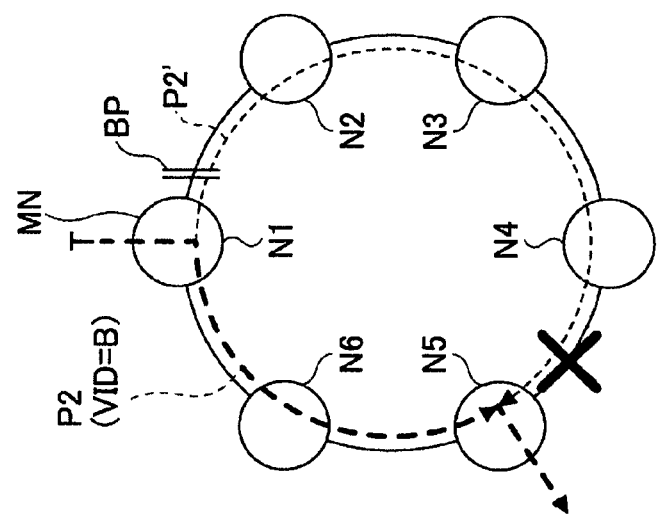
Figure 2C:
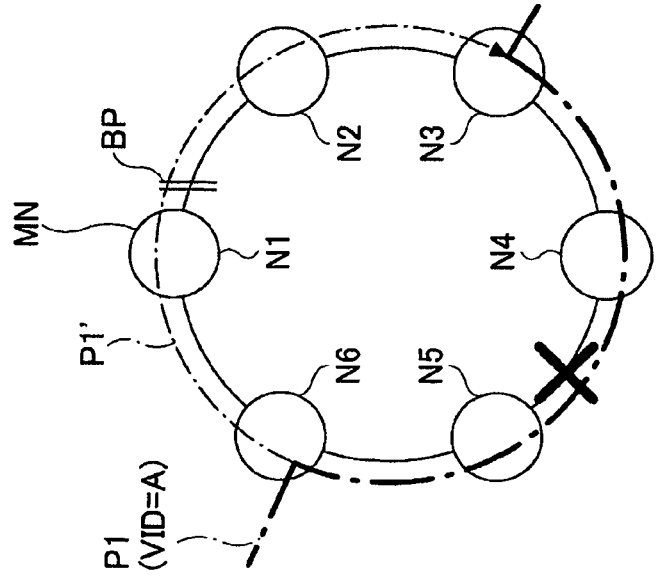

In the ring-type communication system, for example, three communication paths P1, P2 and P3 are set, as depicted in FIGS. 2A, 2B, 2C and 3. The communication paths are classified into paths for an ordinary occasion (usual paths) in which no communication failure occurs and detours (reserve paths) used when a communication failure occurs. A usual path of the communication path P1 is a path through which, as depicted in FIG. 2A, data transmitted from the outside of the ring-type communication system and received by the node N6 is transmitted to the outside of the ring-type communication system from the node N3 via the nodes N5 and N4. A usual path of the communication path P2 is a path through which, as depicted in FIG. 2B, data transmitted from the outside and received by the master node N1 is transmitted to the outside from the node N5 via the node N6. A usual path of the communication path P3 is a path through which, as depicted in FIG. 2C, data transmitted from the outside and received by the node N5 is transmitted to the outside from the node N2 via the nodes N4 and N3. It is noted that, in the description below, a reserve path for a usual path Pn (n is an integer) is referred to as a "reserve path Pn'", and a path including both the usual path Pn and the reserve path Pn' is referred to as a "communication path Pn". For example, a reserve path of the usual path P1 is referred to as a "reserve path P1'", and a path including both the usual path P1 and the reserve path P1' is referred to as a "communication path P1".

Further, in the description below, frame data received from the outside of the ring-type communication path is referred to as "external data", and a node that transmits "external data" in the ring-type communication path may be referred to as a "starting-point node". Frame data received from the ring-type communication path is referred to as "internal data", and a node that transmits "internal data" to the outside of the ring-type communication path may be referred to as an "ending-point node".

Figure 3:
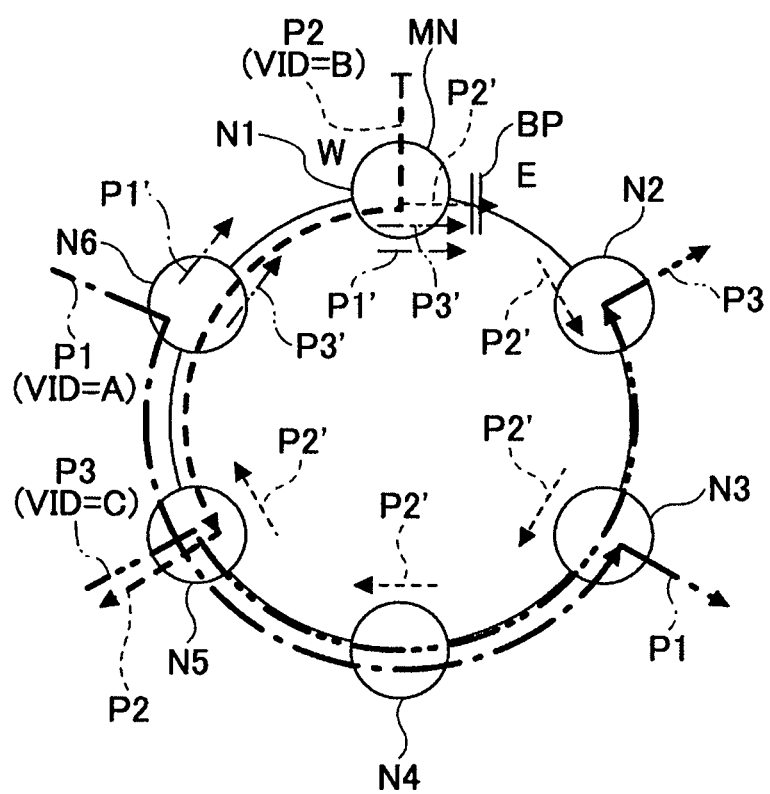
FIG. 3 is a system diagram depicting a usual path and a reserve path that are set in the ring-type communication system in the embodiment of the present invention.

As depicted in FIG. 3, a VID "A" as a path identifier is given to the communication path P1. A VID "B" as a path identifier is given to the communication path P2. A VID "C" as a path identifier is given to the communication path P3. Each of the nodes N1, N2, N3, N4, N5 and N6 reads VID included in frame data, and determines that the node has received the frame data corresponding to any one of the communication paths P1, P2 and P3. Then, the node transfers the received frame data in a transmission direction (port) that is set in association with the determined one of the communication paths P1, P2 and P3.

Further, each of the nodes N1, N2, N3, N4, N5 and N6 carries out an operation to switch from a usual path to a reserve path in an ordinary occasion in which no communication failure occurs and in an occasion in which a communication failure has occurred. For this purpose, each of the nodes N1, N2, N3, N4, N5 and N6 stores information for setting a communication path (usual path and reserve path).

This information is stored by each of the nodes N1, N2, N3, N4, N5 and N6 in a form of a forwarding table. Each starting-point node stores, in association with VID, a reception direction and a transmission direction for when external data received from the outside is transmitted in the ring-type communication path in such a manner that the starting-point node functions as a starting point in the ring-type communication path. Each ending-point node stores, in association with VID, a reception direction and a transmission direction for when the node functions as an ending point in the ring-type communication path and transmits internal data to the outside.

For example, in the node N6 depicted in FIG. 3, as depicted in FIG. 4, forwarding information is stored in a forwarding table. The forwarding table associates, for each VID that is a path identifier, a destination MAC address, flag information of a usual path or a reserve path, a reception direction and a transmission direction with one another. It is noted that a reception direction and a transmission direction may be expressed by port numbers of each node.

As depicted in FIGS. 3 and 4, a usual path P1 for receiving external data including VID=A from a T (tributary) direction, and transferring the received data in a W (west) direction for an ordinary occasion is set in the node N6. Further, in the node N6, a reserve path P1' for receiving external data including VID=A from a T direction, and transferring the received data in an E (east) direction for an occasion in which a communication failure has occurred is set for the purpose of switching from the usual path P1 to the reserve path P1'. Further, in the node N6, a usual path P2 for receiving external data including VID=B from an E direction and transferring the received data in a W direction for an ordinary occasion is set. Further, in the node N6, a reserve path P3' for receiving external data including VID=C from a W direction, and transferring the received data in an E direction for an occasion of a communication failure is set.

It is noted that in the forwarding table depicted in FIG. 4, in association with VID, a destination MAC address is also set. Therefore, each of the master node N1, the nodes N2, N3, N4, N5 and N6 may determine a communication path not only by reading VID but also by reading the destination MAC address. It is noted that in the description below, a case where a communication path is determined only by reading VID will be described.

Therefore, in the ring-type communication system described above, in a case of a communication failure, as depicted in FIGS. 2A, 2B and 2C, the usual paths P1, P2 and P3 depicted by bold lines may be switched to the reserve paths P1', P2' and P3' depicted by thin lines.

In order to switch from the usual paths P1, P2 and P3 to the reserve paths P1', P2' and P3', any one of the master node N1, the nodes N2, N3, N4, N5 and N6 detects a communication failure. For this purpose, in the ring-type communication system, as depicted in FIGS. 5A and 5B, for example, the nodes N4 and N5 that have detected a communication failure 101 transmit failure notification messages 102 to the master node N1. The failure notification messages 102 are transmitted to the master node N1 via the node N6, and are also transmitted to the nodes N2 and N3. Therefore, all of the nodes N1, N2, N3, N4, N5 and N6 can recognize that the failure 101 has occurred.

In a case of receiving the failure notification messages 102, the master node N1 opens the blocking port BP that is set in the own E direction. Thereby, frame data can be transferred through the reserve paths P1', P2' and P3' even after the usual paths P1, P2 and P3 depicted in FIG. 5A are switched to the reserve paths P1', P2' and P3' depicted in FIG. 5B.

[One Operation Example of Node]

Figure 6:
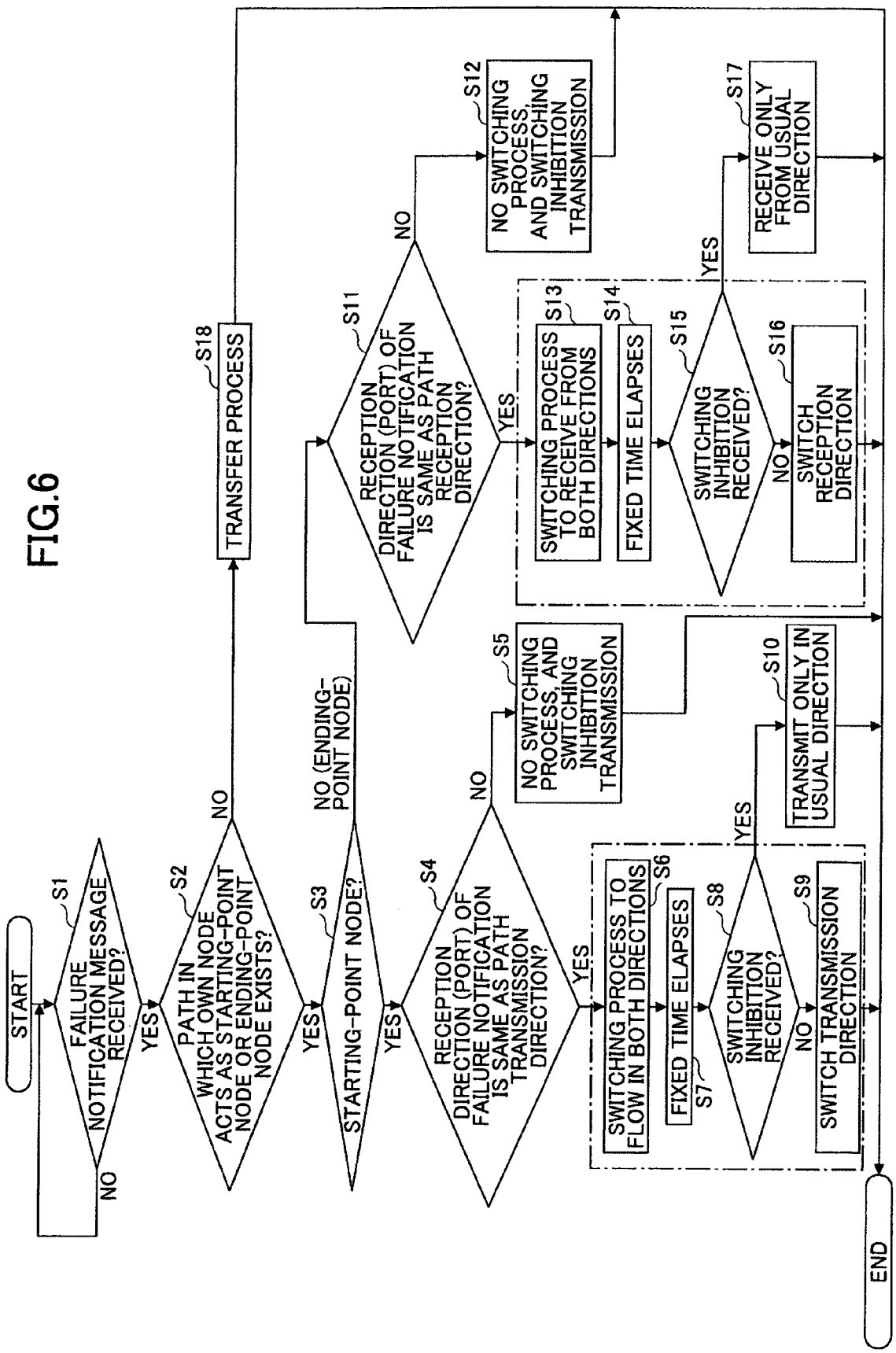
FIG. 6 depicts a method of a communication path switching process that each node carries out in the ring-type communication system in the embodiment of the present invention.

In the ring-type communication system carrying out the operations described above, each of the master node N1 and the nodes N2, N3, N4, N5 and N6 carries out a communication path switching process depicted in FIG. 6. The communication path switching process of FIG. 6 is carried out every predetermined time period. The communication path switching process is carried out as a result of each of the master node N1 and the nodes N2, N3, N4, N5 and N6 reading program data stored by a memory, and a CPU and so forth in the node executing the program.

First, in step S1, the node 1 determines whether the node 1 has received a failure notification message 102. When having received a failure notification message 102, step S2 is proceeded to.

Next, in step S2, the node 1 determines whether a communication path in which the node 1 functions as a starting-point node or a communication path in which the node 1 functions as an ending-point node exists. At this time, the node 1 reads the forwarding table, and, when a reception direction or a transmission direction is a "T direction", the node 1 determines YES. In a case where the node 1 functions as a starting-point node or an ending-point node, step S3 is proceeded to. On the other hand, in a case where the node 1 functions as neither a starting-point node nor an ending-point node, step S18 is proceeded to. In step S18, the failure notification message 102 received in step S1 is transferred.

In step S3, the node 1 determines whether the node 1 is a starting-point node. In a case where the node 1 is a starting-point node, step S4 is proceeded to. In a case where the node 1 is not a starting-point node, step S11 is proceeded to.

In step S4, the starting-point node determines whether a reception direction of the failure notification message 102 is the same as a transmission direction of frame data in the communication path in which the node 1 is the starting-point node as determined in step S2. In a case where the reception direction of the failure notification message 102 is different from the transmission direction of the frame data, step S5 is proceeded to. In a case where the reception direction of the failure notification message 102 is the same as the transmission direction of the frame data, step S6 is proceeded to.

In step S5, the starting-point node does not switch a usual path to a reserve path, transmits a switching inhibition message 105 that inhibits switching of a usual path to a reserve path to the other nodes 1, and finishes the process. At this time, the starting-point node includes, in the switching inhibition message 105, VID of the communication path in which it is determined in step S2 as being the starting-point node. Thereby, the starting-point node can inhibit the other nodes 1 (intermediate nodes and ending-point node) in the communication path from switching to reserve paths.

Figure 7:
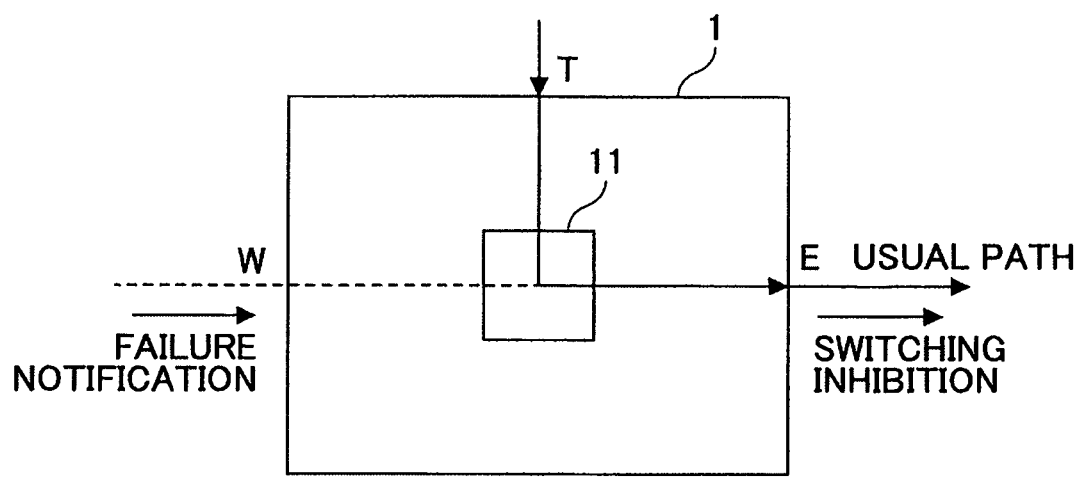
FIG. 7 illustrates a process of transmitting a switching inhibition message in a case where a reception direction of a failure notification message is different from a transmission direction of frame data at a starting-point node.

That is, as depicted in FIG. 7, it is assumed that the failure notification message 102 is received from the W direction in a case where such a communication path is set that the node 1 receives data from the T direction, and the frame data is transmitted in the E direction by means of an internal switch 11. In this case, the transmission direction of the frame data in the usual path is the E direction, and the failure notification message 102 is received from the W direction. Therefore, the determination in step S4 is NO, and the node 1 transmits the switching inhibition message 105 in the E direction. When such an operation is applied to the example of FIGS. 5A and 5B, the operation is carried out by the master node N1 functioning as the starting-point node in the usual path P2.

The starting-point node switches the usual path to the reserve path through a process of steps S6 through S9. First, in step S6, the starting-point node carries out a switching process to transmit frame data in both directions (this may be broadcast) of the W direction and the E direction. Thereby, the starting-point node temporarily provides a redundancy. The redundancy is called "1+1" for example. Next, the starting-point node determines that a fixed time period has elapsed, in step S7. Next, the starting-point node determines in step S8 whether the starting-point node has received a switching inhibition message 105. In a case where the starting-point node has not received a switching inhibition message 105, step S9 is proceeded to. In step S9, the starting-point node switches the transmission direction of frame data by switching from the usual path to the reserve path.

The fixed time period in step S7 is a time period that is set for each node, and is set such that a starting-point node can carry out switching or maintaining of a communication path without error when the starting-point node has received a failure notification message 102 in the same direction as a transmission direction of frame data. Therefore, the fixed time period is preferably set to be at least the maximum value of a time period for a circulation of a switching inhibition message 105 in the ring-type communication path. That is, such a time period that in a case where a switching inhibition message 105 is transmitted by another node, the switching inhibition message 105 can be positively received is set as the fixed time period.

Figure 8A:
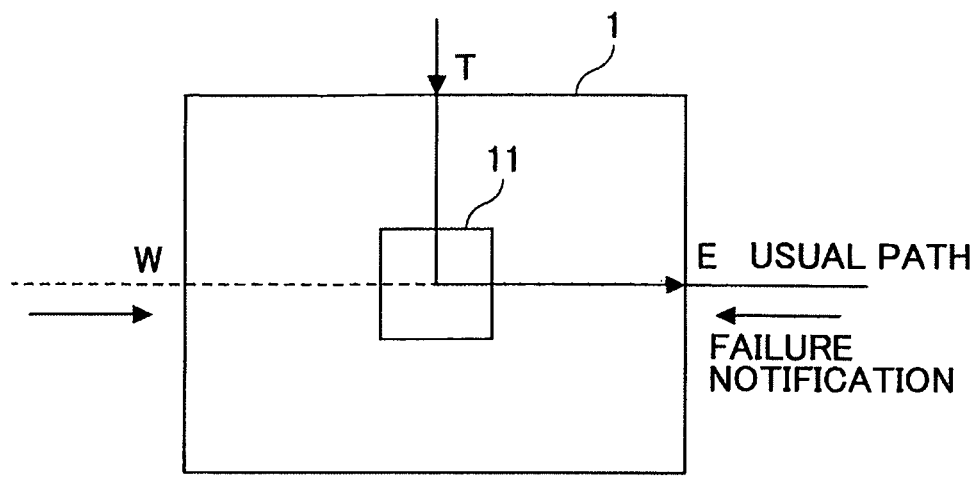
FIGS. 8A and 8B illustrate a process of switching to a reserve path in a case where a reception direction of a failure notification message is the same as a transmission direction of frame data at a starting-point node.
Figure 8B:
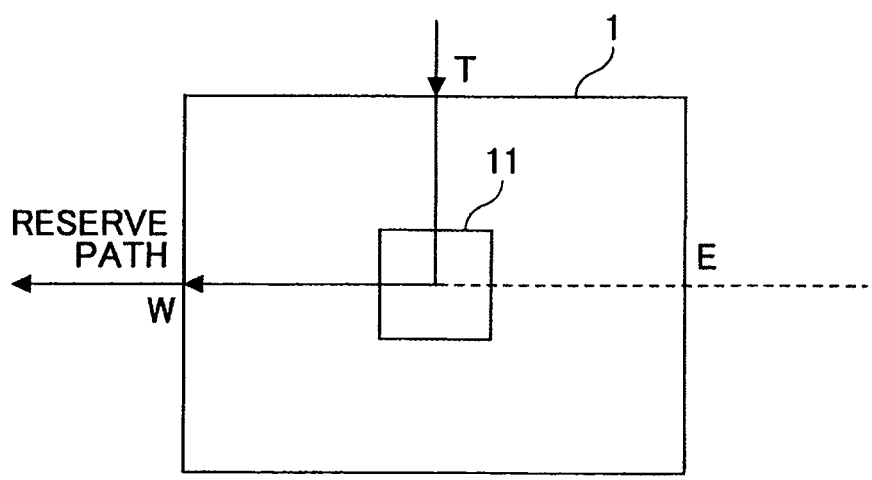

For example, it is assumed that, as depicted in FIG. 8A, in a case where such a usual path is set that the node 1 receives external data from the T direction and the received data is transmitted in the E direction by the internal switch 11, a failure notification message 102 is received from the E direction. In this case, the transmission direction in the usual path is the E direction, and the failure notification message 102 has been received from the same E direction. Therefore, a determination in step S4 is YES. Therefore, the node 1 switches the usual path to the reserve path as depicted in FIG. 8B after the elapse of the fixed time period. When this operation is applied to the example of FIGS. 5A and 5B, the node N6 in the usual path P1 carries out the operation.

On the other hand, in step S8, in a case where the starting-point node determines that the starting-point node has received a switching inhibition message 105, the starting-point node does not switch the usual path to the reserve path, and finishes the process with the setting being maintained in which frame data is transmitted in the usual path, in step S10.

On the other hand, an ending-point node carries out a process starting from step S11. In step S11, the ending-point node determines whether the reception direction of the failure notification message 102 is the same as the reception direction of frame data (internal data) in the usual path in which the ending-point node is determined as the ending-point node in step S2. In a case where the reception directions of the failure notification message 102 and frame data are different from one another, step S12 is proceeded to. In a case where the reception directions of the failure notification message 102 and frame data are the same as one another, step S13 is proceeded to.

In step S12, the ending-point node does not switch the usual path to the reserve path, transmits a switching inhibition message 105 for inhibiting switching from the usual path to the reserve path to the other nodes, and finishes the communication path switching process. At this time, the ending-point node includes, in the switching inhibition message, VID of the communication path for which the ending-point node is determined as the ending-point node in step S2.

Figure 9:
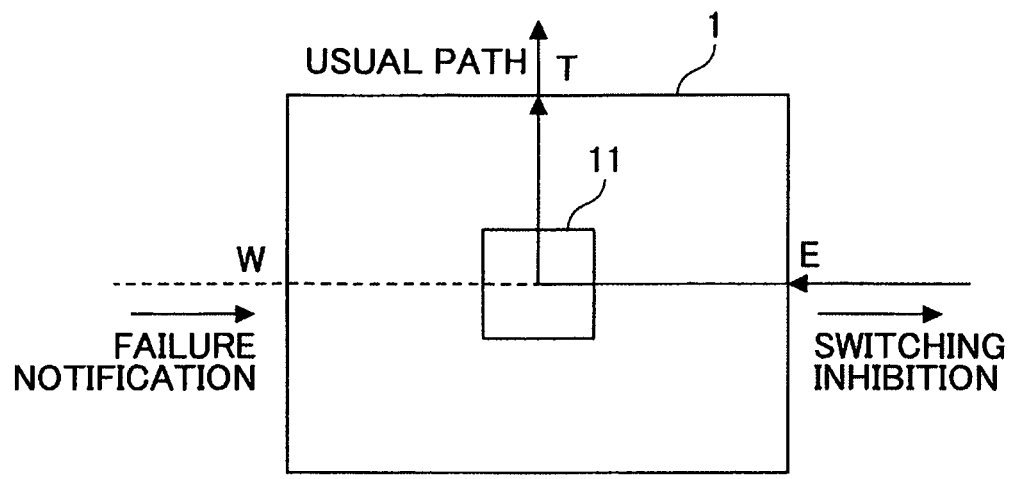
FIG. 9 illustrates a process of transmitting a switching inhibition message in a case where a reception direction of a failure notification message is different from a reception direction of frame data at an ending-point node.

That is, it is assumed that, as depicted in FIG. 9, in a case where a usual path is set such that a node 1 receives frame data from the E direction and the frame data (internal data) is transmitted to the T direction by an internal switch 11, a failure notification message 102 is received from the W direction. In this case, the reception direction of the internal data in the usual path is the E direction, and the failure notification message 102 has been received from the W direction. Therefore, a determination result of step S11 is NO. Therefore, the node 1 transmits the switching inhibition message 105 in the E direction. When such an operation is applied to the example of FIGS. 5A and 5B, the node N3 in the usual path P1 and the node N2 in the usual path P3 carry out the operation.

In step S13, the ending-point node carries out a switching process to receive frame data from both directions of the W direction and the E direction. Thereby, the ending-point node temporarily provides a redundancy. The redundancy may be called "1+1". Next, the ending-point node determines in step S14 that a fixed time period has elapsed. The fixed time period is the same as the fixed time period that is set in step S7. Next, the ending-point node determines in step S15 whether the ending-point node has received a switching inhibition message 105. In a case where the ending-point node does not have received a switching inhibition message 105, step S16 is proceeded to. In step S16, the ending-point node switches from the usual path to the reserve path, and thus, switches the reception direction of frame data.

Figure 10A:
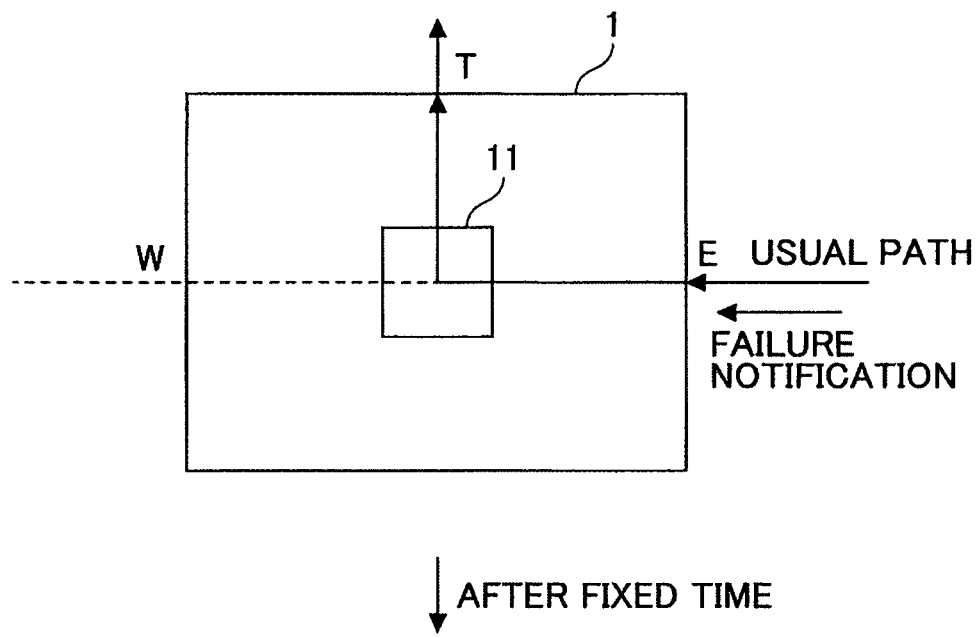
FIGS. 10A and 10B illustrate a process of switching to a reserve path in a case where a reception direction of a failure notification message is the same as a reception direction of frame data at an ending-point node.
Figure 10B:
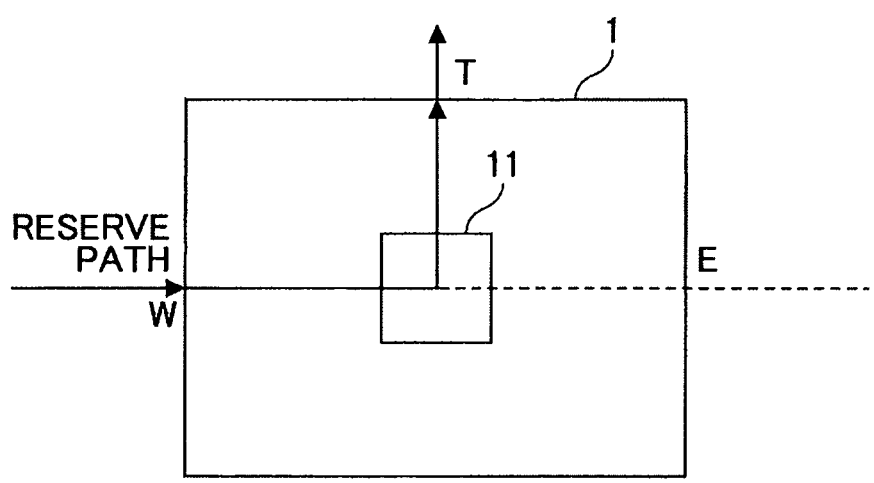

That is, it is assumed that, as depicted in FIG. 10A, in a case where such a usual path is set that the node 1 receives internal data from the E direction and the received data is transmitted in the T direction by the internal switch 11, a failure notification message 102 is received from the E direction. In this case, the reception direction of frame data is the E direction, and the failure notification message 102 has been received from the same E direction. Therefore, a determination in step S11 is YES. Therefore, the node 1 switches the usual path to the reserve path as depicted in FIG. 10B after the elapse of the fixed time period. When this operation is applied to the example of FIGS. 5A and 5B, the node N3 in the usual path P1 and the node N2 in the usual path P3 carry out the operation.

On the other hand, in step S15, in a case where the ending-point node determines that the ending-point node has received a switching inhibition message 105, the ending-point node does not switch the usual path to the reserve path, and finishes the process with the setting being maintained in which frame data is received from the usual path, in step S17.

The ring-type communication system that carries out the above-mentioned communication path switching process operates as depicted in FIGS. 11A, 11B, 11C and 11D, for example. It is noted that the step numbers in the description below correspond to the step numbers in FIG. 6.

As depicted in FIG. 11A, a usual path P1 is set such that the node N6 functions as a starting-point node and the node N3 functions as an ending-point node. It is assumed that a failure 101 occurs between the nodes N4 and N5. At this time, failure notification messages 102 are transmitted from the nodes N4 and N5 to the master node N1.

The node N6 functioning as the starting-point node and receiving the failure notification message 102 enters a state in which the node N6 transmits frame data in both directions (this may be broadcast) (step S6) as depicted in FIG. 11B since the reception direction of the failure notification message 102 is the same as the transmission direction of frame data. Further, the node N3 functioning as the ending-point node enters a state in which the node N3 receives frame data from both directions since the reception direction of the failure notification message 102 is the same as the reception direction of frame data.

In this state, the master node N1 opens the blocking port BP as depicted in FIG. 11C in response to receiving the failure notification message 102. Thereby, since the node N6 transmits frame data in both directions (this may be broadcast) and the node N3 receives frame data from both directions, the node N3 can receive frame data transmitted by the node N6. Thereafter, when the nodes N6 and N3 determine the elapse of the fixed time period, the nodes N6 and N3 can switch from the usual path P1 to the reserve path P1' as depicted in FIG. 11D (steps S9 and S16).

Further, the ring-type communication system that carries out the above-mentioned communication path switching process operates as depicted in FIGS. 12A, 12B, 12C, 12D and 12E, for example. As depicted in FIG. 12A, a usual path P2 is set such that the master node N1 functions a starting-point node, and the node N5 functions as an ending-point node. It is assumed that a failure 101 occurs between the nodes N4 and N5. At this time, the nodes N4 and N5 transmit failure notification messages 102 to the master node N1. It is noted that the node N5 carries out the operations below with regarding a direction of detecting the failure as a reception direction of the failure notification message 102.

The node N5 functions as the ending-point node, and the reception direction (the direction in which the failure 101 has occurred) of the failure notification message 102 is different from the reception direction of frame data. Therefore, the node N5 carries out the process of step S12. Thereby, the ending-point node transmits a switching inhibition message 105 to the node N6 as depicted in FIG. 12B. Further, the master node N1 functioning as the starting-point node receives the failure notification message 102 that is transmitted by the node N5. Then, the master node N1 opens the blocking port BP in response to receiving the failure notification message 102.

The master node N1 functions as the starting-point node and the reception direction of the failure notification message 102 is the same as the transmission direction of frame data. Therefore, as depicted in FIG. 12C, the master node N1 enters a state of transmitting frame data in both directions (this may be broadcast) (step S6). After that, the master node N1 receives the switching inhibition message 105 that is transmitted by the node N5 as depicted in FIG. 12D (step S8). Thereby, the master node N1 determines YES in step S8, does not switch from the usual path to the reserve path, and transmits frame data only in the transmission direction of the usual path as depicted in FIG. 12E (step S10).

As described above, each of the master node N1 and the nodes N2, N3, N4, N5 and N6 carries out the communication path switching process depicted in FIG. 6. Thereby, the ring-type communication system can carry out the process of switching from the usual path to the reserve path or the process of maintaining the communication path, as depicted in FIGS. 11A through 11D and FIGS. 12A through 12E, in an occasion of an occurrence of a failure.

[One Example of Configuration of Node]

Figure 13:
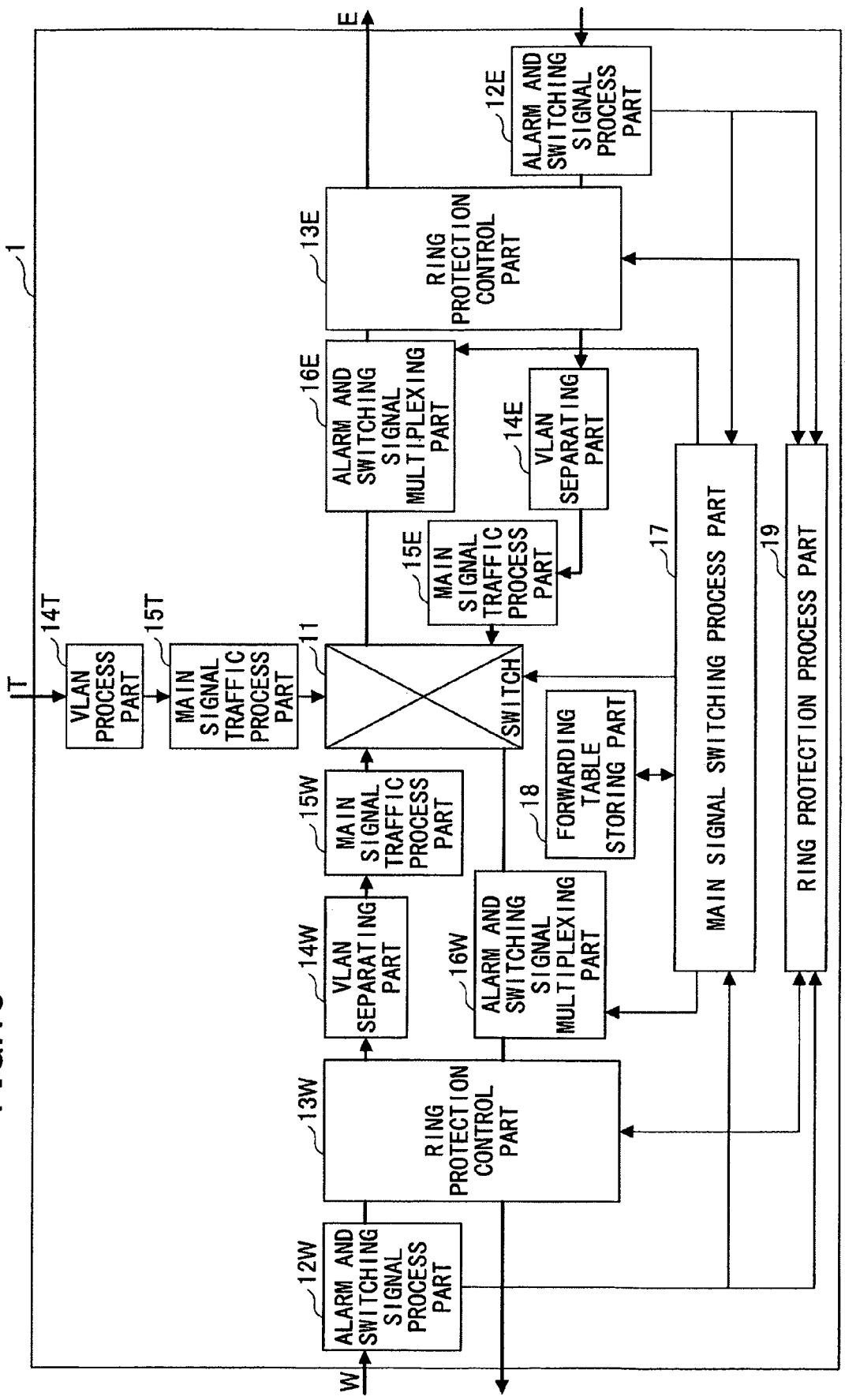
FIG. 13 depicts a block diagram of one example of a configuration of a node in the ring-type communication system in the embodiment of the present invention.

Next, one example of a configuration of each (node 1) of the master node N1 and the nodes N2, N3, N4, N5 and N6, which carries out the above-described operations, will now be described with reference to FIG. 13.

The node 1 has the switch 11. To the switch 11, parts 14T and 15T which carry out a process on data transmitted in or received from the T direction, parts 12W through 16W which carry out a process on data transmitted in or received from the W direction, and parts 12E through 16E which carry out a process on data transmitted in or received from the E direction are connected. Further, the node 1 includes a main signal switching process part 17, a forwarding table storing part 18 and a ring protection process part 19.

The parts 12W through 16W which carry out the data transmitting and receiving processes for the W direction include an alarm and switching signal process part 12W, a ring protection control part 13W, a VLAN separating part 14W, a main signal traffic process part 15W and an alarm and switching signal multiplexing part 16W. It is noted that the parts 12E through 16E for the E direction have the same functions as those of the parts 12W through 16W for the W direction. Further, the parts 14T and 15T for the T direction have the same functions as those of the VLAN separating part 14W and the main signal traffic process part 15W for the W direction.

The alarm and switching signal process parts 12W and 12E are connected to ports in the W direction and ports in the E direction, respectively, with respect to the ring-type communication path. The alarm and switching signal process part 12W or 12E receives frame data or a ring-protection control frame from an adjacent node 1. In a case of receiving the ring-protection control frame, the alarm and switching signal process part 12E or 12W provides the ring-protection control frame to the ring protection control part 13E or 13W and the ring-protection process part 19. It is noted that the ring-protection control frame is a signal concerning alarm or path switching against a failure 101, and includes a failure notification message 102, a recovery notification message 103, a re-setting notification message 104 and a switching inhibition message 105.

In a case of receiving frame data, the node 1 obtains VID included in the frame data by the VLAN separating part 14W or 14E via the alarm and switching signal process part 12W or 12E and the ring protection control part 13W or 13E. Then, the VLAN separating part 14W or 14E reads the forwarding table stored by the forwarding table storing part 18 based on the obtained VID. The VLAN separating part 14W or 14E determines whether the VID obtained from the frame data is registered in the forwarding table. In a case where the VID obtained from the frame data is included in the forwarding table, the VLAN separating part 14W or 14E outputs the frame data to the main signal traffic process part 15W or 15E. In a case where the VID obtained from the frame data is not registered in the forwarding table, the VLAN separating part 14W or 14E discards the frame data. The main signal traffic process part 15W or 15E takes out a main signal stored in a data part of the frame data, and provides the main signal to the switch 11.

The switch 11 relays the main signal according to the control of the main signal switching process part 17. The switch 11 outputs the main signal to the alarm and switching signal multiplexing part 16W or 16E of the reverse direction in a case where, based on the forwarding table, the main signal will be relayed to an adjacent node. Further, in a case where, based on the forwarding table, the main signal will be output to the outside, the switch 11 outputs the main signal to the VLAN process part 14T.

When detecting a failure 101 between the node 1 and an adjacent node, the alarm and switching signal process part 12W or 12E reports this matter to the ring protection process part 19. Then, the ring protection process part 19 causes the ring protection control part 13W or 13E of the direction reverse to the direction in which the failure 101 is detected to transmit a failure notification message 102 that reports the failure 101 to the master node N1.

Further, when receiving a failure notification message 102, the alarm and switching signal process part 12W or 12E provides the failure notification message 102 to the ring protection process part 19. In a case where the node 1 is not the master node N1, the ring protection process part 19 causes the ring protection control part 13W or 13E to relay the failure notification message 103. In a case where the node 1 is the master mode N1, the ring protection control part 19 responds to receiving the failure notification message 102, and opens the blocking port BP. After that, in response to the ring protection control part 13W or 13E receiving a recovery notification message 103, the ring protection process part 19 again sets the blocking port BP. After the again setting the blocking port BP, the ring protection process part 19 transmits re-setting notification messages 104 to the other nodes.

Thus, the node 1 can carry out a protection process that includes failure detection, failure notification, opening of the blocking port BP and again setting the blocking port BP, recovery notification and re-setting notification of the blocking port BP.

The main signal switching process part 17 carries out the communication path switching process depicted in FIG. 6. In a case where the node 1 receives a failure notification message 102, the main signal switching process part 17 receives the failure notification message 102 from the alarm and switching signal process part 12W or 12E. Then, the main signal switching process part 17 reads the forwarding table stored by the forwarding table storing part 18, and can determine whether the node 1 is a starting-point node or an ending-point node. The main signal switching process part 17 can compare the reception direction of the failure notification message 102 and the transmission direction or the reception direction of frame data in the usual path by determining whether the failure notification message is received by the alarm and switching signal process part 12W or 12E. Thus, it is possible to carry out steps S1 through S4 and step S11 of FIG. 6.

Then, in a case where the node 1 is a starting-point node and the reception direction of the failure notification message 102 is the same as the transmission direction of frame data in the usual path, the main signal switching part 17 causes both the alarm and switching signal multiplexing parts 16W and 16E to transmit frame data. Similarly, in a case where the node 1 is an ending-point node and the reception direction of the failure notification message 102 is the same as the reception direction of frame data in the usual path, the main signal switching part 17 causes both the main signal traffic process parts 15W and 15E to receive frame data. Thereby, it is possible to carry out steps S6 and S13.

After that, the main signal switching process part 17 determines whether the alarm and switching signal process part 12W or 12E has received a switching inhibition message 105 after the elapse of the fixed time period. In a case where the alarm and switching signal process part 12W or 12E has not received a switching inhibition message 105, the main signal switching process part 17 reads the forwarding table and switches the usual path to the reserve path. On the other hand, in a case where the alarm and switching signal process part 12W or 12E has received a switching inhibition message 105, the main signal switching process part 17 does not carry out the path switching. Thereby, it is possible to carry out steps S7 through S10 and steps S14 through S17.

Further, in a case where the node 1 is a starting-point node and the reception direction of the failure notification message 102 is different from the transmission direction of frame data in the usual path, the main signal switching process part 17 transmits a switching inhibition message 105 in the direction reverse to the direction in which the failure notification message 102 is received. That is, the failure notification message 102 and the switching inhibition message 105 are transmitted in the same direction. Similarly, in a case where the node 1 is an ending-point node and the reception direction of the failure notification message 102 is different from the reception direction of frame data in the usual path, the main signal switching process part 17 transmits a switching inhibition message 105 in the direction reverse to the direction in which the failure notification message 102 is received. Thereby, it is possible to carry out step 5 and step 12.

ADVANTAGEOUS EFFECTS OF THE EMBODIMENT

As described above, according to the ring-type communication system, even though the predetermined ring-protection method is introduced in the ring-type communication path, a communication path is determined by using a path identifier and frame data is relayed. Therefore, in an occasion where a failure occurs, a reserve communication path is determined by using a path identifier, and communications can be carried out.

Specifically, the node 1 stores a reception direction and a transmission direction for when the node 1 functions as a starting-point node and transmits external data, or a reception direction and a transmission direction for when the node 1 functions as an ending-point node and transmits internal data, in association with VID that is a path identifier. Then, in a case of receiving a failure notification message 102, the node 1 switches the transmission direction of external data or the reception direction of internal data based on a relationship between the reception direction of the failure notification message 102 and the transmission direction or the reception direction which is given and stored. Thus, according to the ring-type communication system, it is possible to relay frame data by using a reserve path by switching the communication path that is given and set, in an occasion where a failure has occurred.

Specifically, for example, even through G. 8032 that is the ring-protection method for coping with a failure occurring in a ring-type communication system is used, and a P2P path is used in the ring-type communication system, it is possible to appropriately switch a path by using VID that is a path identifier for determining the P2P path. Therefore, according to the ring-type communication system, it is possible to realize data relay by determining a communication path determined by using VLAN, or data relay without needing address learning, even in the ring-type network environment employing the existing Ethernet (registered trademark).

It is noted that, in the above-described example of the ring-type communication system, VID or a combination of VID and MAC address is used to determine a communication path or a reserve path. However, a communication path may be determined by using another, for example, a level defined by MPLS (Multi-Protocol Label Switching).

Other Embodiment

Next, another embodiment of the above-described ring-type communication system will be described. It is noted that, for parts identical to those of the above-described embodiment, the same reference numerals are given, and detailed description therefor will be omitted.

[Returning Operation from Reserve Path]

First, with reference to FIGS. 14A and 14B, how switching to return to the usual path from the reserve path after recovering from the failure 101 is carried out will be described.

When recovering from the failure 101 is carried out as depicted in FIG. 14A, the nodes N4 and N5 which detected the failure 101 transmit recovery notification messages 103 to the master node N1. In response, the master node N1 transmits a re-setting notification message 104 for again setting the blocking port BP. The re-setting notification message 103 is received by each node in the ring-type communication system, and, in each node, a process as a starting-point node or a process as an ending-point node is carried out according to the settings of communication paths. The starting-point nodes and the ending-point nodes switch from the reserve paths P1', P2' and P3' to return to the usual paths P1, P2 and P3 in response to receiving the re-setting notification message, as depicted in FIG. 14B.

At this time, the starting-point node switches the transmission direction of external data based on a relationship between the reception direction of the re-setting notification message 104 and the transmission direction of frame data for a current situation. Further, the ending-point node switches the reception direction of internal data based on a relationship between the reception direction of the re-setting notification message 104 and the reception direction of frame data for a current situation.

Figure 15:
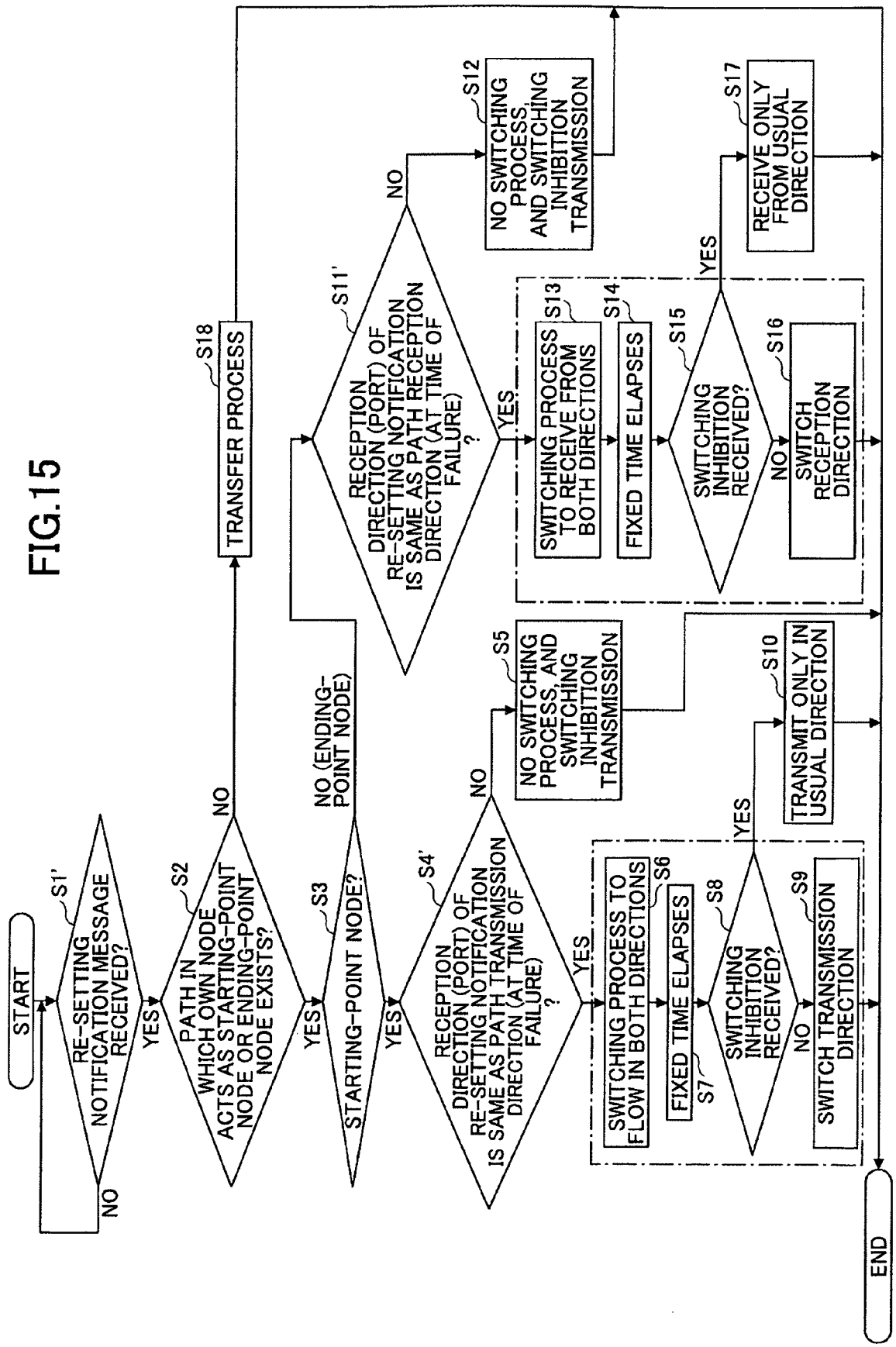
FIG. 15 depicts a method for when a node receives a re-setting notification message in the ring-type communication system in the embodiment of the present invention.

Specifically, a process depicted in FIG. 15 is carried out. First, in step S1', in a case of having received a re-setting notification message 104, the node 1 carries out step S2. In step S2, in a case where the node 1 determines as being a starting-point node or an ending-point node, the node 1 carries out step S3. In step S3, in a case where the node 1 determines as being a starting-point node, the node 1 carries out step S4'. In step S3, in a case where the node 1 determines as not being a starting-point node, the node 1 carries out step S11'.

In step S4', the node 1 determines whether the reception direction of the re-setting notification message 104 is the same as the transmission direction of frame data for a current situation (occasion of failure). In a case where the directions are the same as one another as a result of the comparison, the node 1 carries out the process starting from step S6, and carries out switching or maintaining the communication path. On the other hand, in a case where the directions are different from one another as a result of the comparison, the node 1 transmits a switching inhibition message 105 in step S5.

In step S11', the node 1 determines whether the reception direction of the re-setting notification message 104 is the same as the reception direction of frame data for the current situation (occasion of failure). In a case where the directions are the same as one another as a result of the comparison, the node 1 carries out the process starting from step S13, and carries out switching or maintaining the communication path. On the other hand, in a case where the directions are different from one another as a result of the comparison, the node 1 transmits a switching inhibition message 105 in step S12.

By carrying out the above-described process, the ring-type communication system can switch from the reserve paths P1' and P3' depicted in FIG. 14A to return to the usual paths P1 and P3 depicted in FIG. 14B. The node N6 as the starting-point node determines YES in step S4', and the node N3 as the ending node determines YES in step S11'. Therefore, no switching inhibition message 105 is transmitted, and the nodes N6 and N3 can switch from the reserve path P1' to return to the usual path P1. Further, the node N5 that is the starting-point node and the node N2 that is the ending-point path of the reserve path P3' can switch from the reserve path P3' to return to the usual path P3 in the same way.

Thus, according to the ring-type communication system described above, the node previously stores the forwarding table, and, in a case where the node has received a re-setting message 104, the node can switch the transmission direction of external data or the reception direction of internal data based on a relationship between the reception direction of the re-setting notification message and the current transmission direction or reception direction. Thereby, in the ring-type communication system, after the node switches from the usual path to the reserve path, the node can switch to return to the usual path in a case where the node has detected that a recovery is carried out from the failure 101.

[Other Example of Failure Notification]

Next, one example of operations of switching a communication path by using failure notification messages 102 transmitted from both in the above-described ring-type communication system will be described.

In the ring-type communication system, as depicted in FIG. 16A, in a case where a failure 101 has occurred between the nodes N4 and N5, the blocking port BP set in the master node N1 is opened as depicted in FIG. 16B. Thereby, the master node N1 relays failure notification messages 102 transmitted by the nodes N4 and N5. Thus, each nodes switches the communication path based on the failure notification messages 102 transmitted by both.

Figure 17:
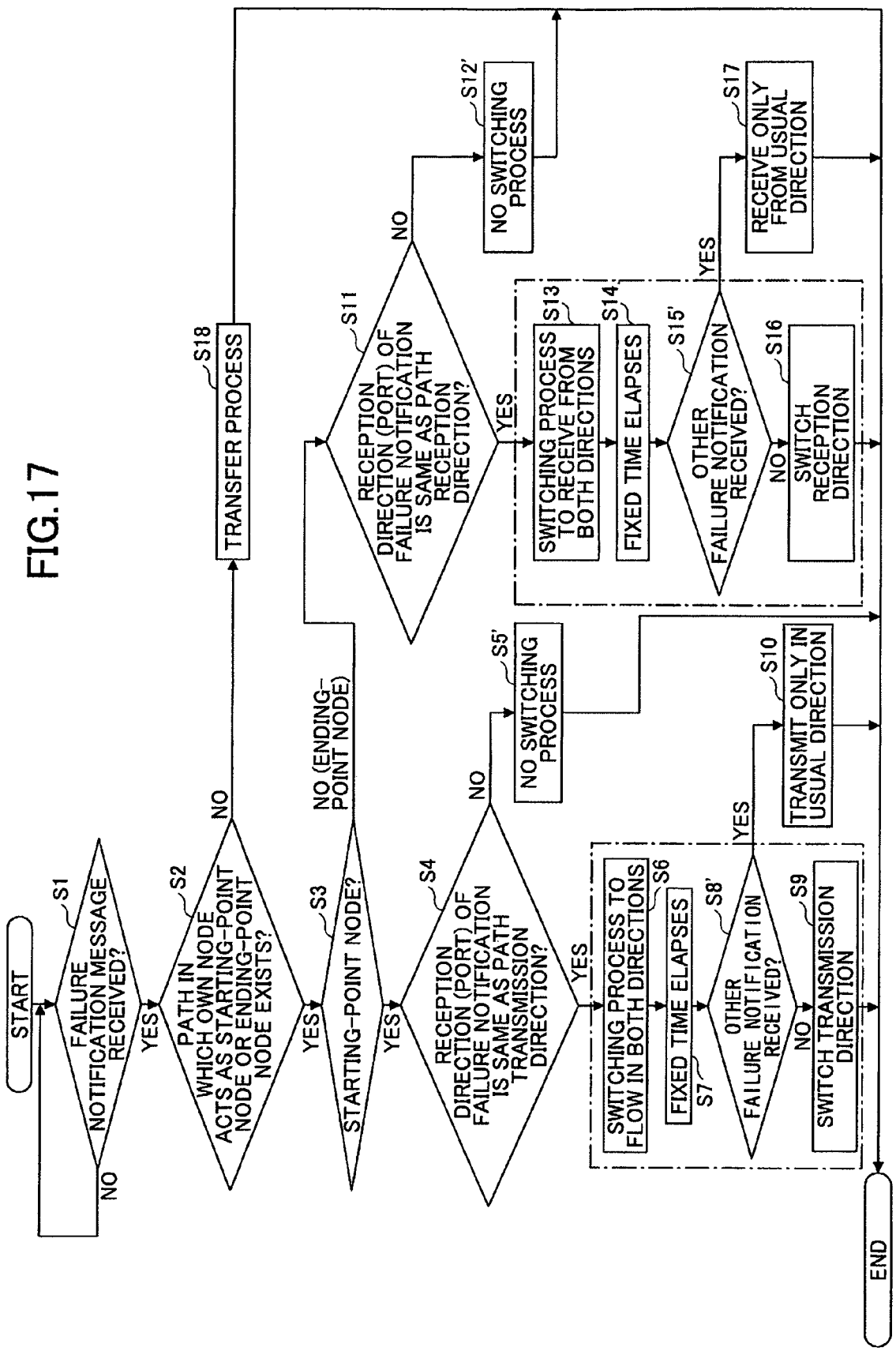
FIG. 17 depicts a method of a process of receiving a failure notification message plural times and switching a communication path in the ring-type communication system in the embodiment of the present invention.

Such operations of the nodes are those depicted in FIG. 17. The starting-point node enters a state in which the starting-point node transmits frame data in both directions (this may be broadcast) in step S6 after steps S1 through S4. Then, after the elapse of the fixed time period, step S8' is proceeded to. In step S8', the starting-point node determines whether the starting-point node has received a failure notification message 102 from the direction reverse to the reception direction of the failure notification message 102 received in step S1. In a case where the starting-point node has not received a failure notification message 102 from the reserve direction, the starting-point node switches the transmission direction in step S9. In a case where the starting-point node has received a failure notification message 102 from the reserve direction, the starting-point node maintains the usual path in step S10.

Further, the ending-point node enters a state in which the ending-point node receives frame data from both directions in step S13 after steps S1 through S3 and step S11. Then, after the elapse of the fixed time period, step S15' is proceeded to.

In step S15', the ending-point node determines whether the ending-point node has received a failure notification message 102 from the direction reverse to the reception direction of the failure notification message 102 received in step S1. In a case where the ending-point node has not received a failure notification message 102 from the reserve direction, the ending-point node switches the reception direction in step S16. In a case where the ending-point node has received a failure notification message 102 from the reserve direction, the ending-point node maintains the usual path in step S17.

Figure 18A:
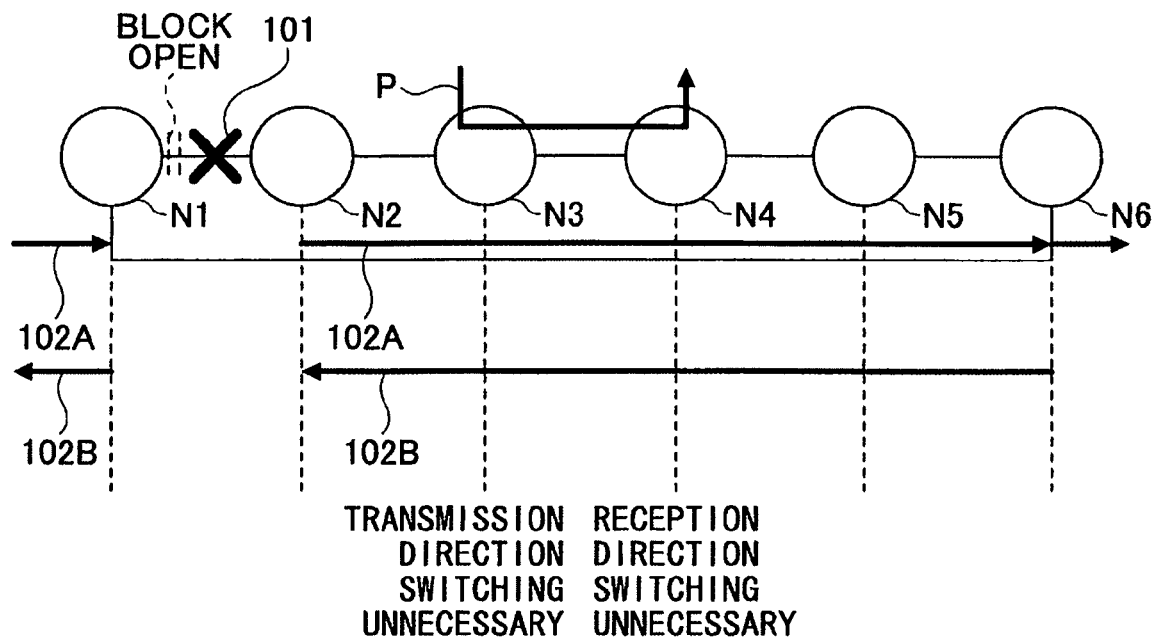
FIGS. 18A, 18B and 18C are system diagrams illustrating operations of receiving a failure notification message plural times and switching a communication path in the ring-type communication system in the embodiment of the present invention.

In the above-described ring-type communication system, it is assumed that, as depicted in FIG. 18A, a starting-point node is the node N3, an ending-point node is the node N4, and a failure 101 has occurred between the master node N1 and the node N2. In this case, a failure notification message 102A is transmitted by the node N2, and also, a failure notification message 102B is transmitted by the master node N1. The starting-point node and the ending-point node first receive the failure notification message 102A transmitted by the node N2, and then, receive the failure notification message 102B transmitted by the master node N1. In the starting-point node, since the reception direction of the failure notification message 102A is different from the transmission direction of frame data, the starting-point node can determine that switching of the transmission direction of frame data is not necessary (steps S4 and S5'). On the other hand, in the ending-point node, although the reception direction of the failure notification message 102A is the same as the reception direction of frame data, the ending-point node can receive the failure notification message 102B in step S15'. Therefore, the ending-point node can determine that switching of the reception direction of frame data is not necessary (steps S11 through S17).

Figure 18B:
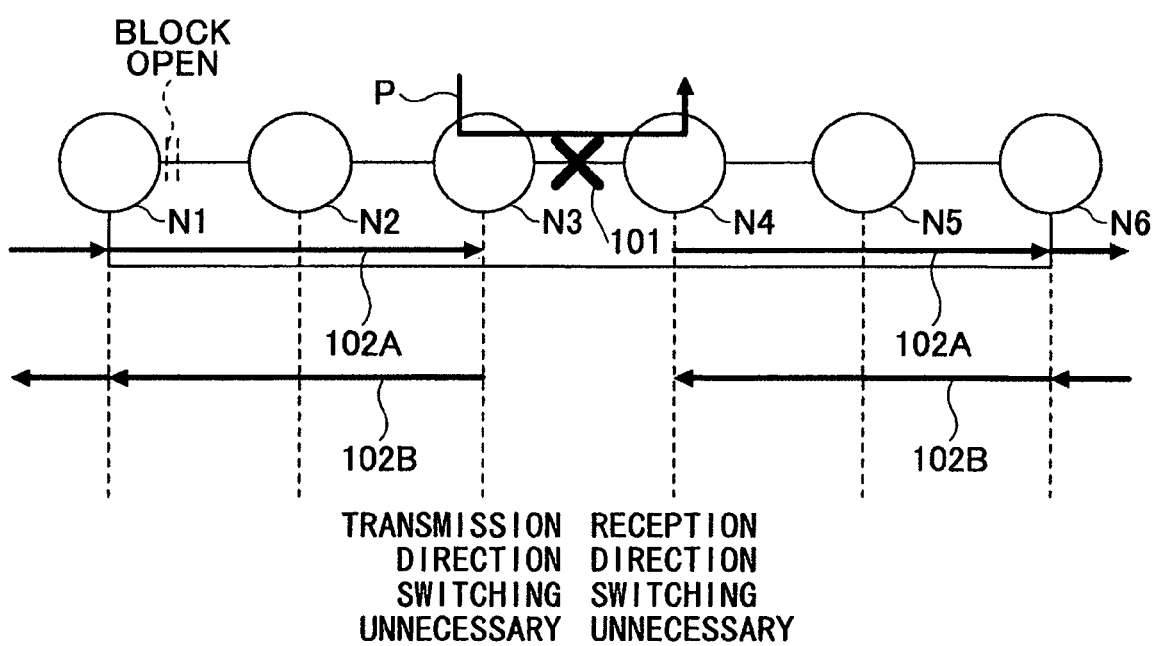

As depicted in FIG. 18B, it is assumed that a failure 101 has occurred between the starting-point node and the ending-point node. At this time, the node N4 transmits a failure notification message 102A and also, the node N3 transmits a failure notification message 102B. In this case, the starting-point node and the ending-point node can receive the failure notification message 102 only once. Therefore, the starting-point node can switch the transmission direction of external data and the ending-point node can switch the reception direction of internal data. It is noted that, in the ring-type communication system for which the one operation example has been depicted in FIGS. 12A through 12E, the node N5 regards the direction in which the failure 101 is detected as the reception direction of the failure notification message 102. However, in the present embodiment, it is determined whether or not the communication path will be switched based on the number of times of receiving actual failure notification messages 102.

Figure 18C:
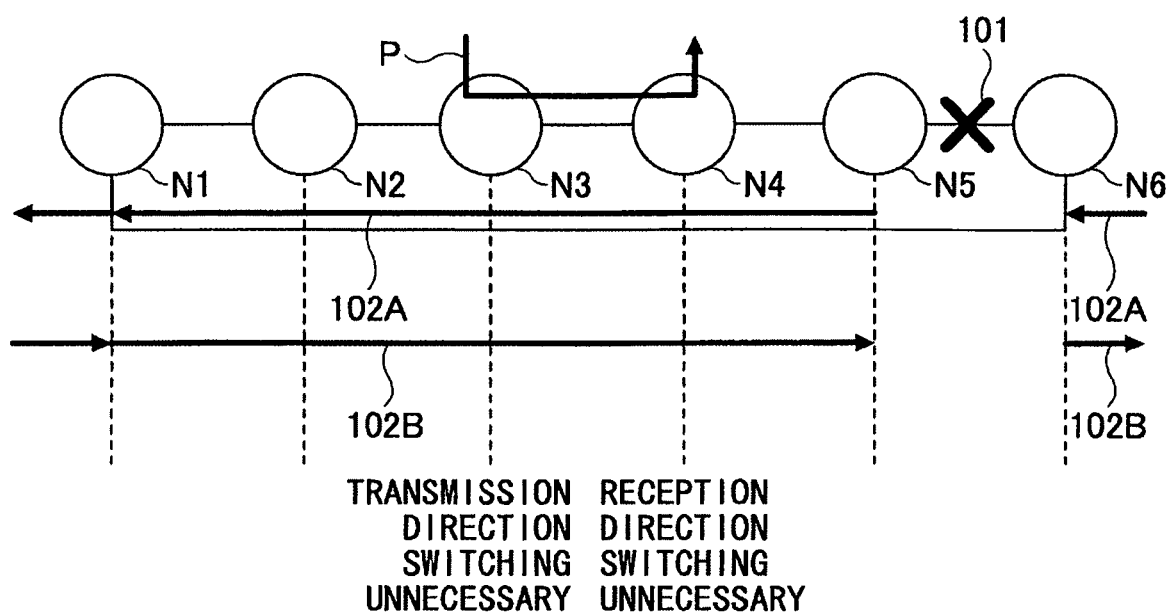

As depicted in FIG. 18C, it is assumed that a failure 101 has occurred between the nodes N5 and N6. At this time, a failure notification message 102A is transmitted by the node N5 and a failure notification message 102B is transmitted by the node N6. The starting-point node and the ending-point node first receive the failure notification message 102A transmitted by the node N5, and then, receive the failure notification message 102B transmitted by the node N6. In the starting-point node, the reception direction of the failure notification message 102A is the same as the transmission direction of frame data, however, the starting-point node can receive the failure notification message 102B (step S8', YES), and therefore, it can be determined that switching of the transmission direction of frame data is not necessary (step S10). On the other hand, in the ending-point node, the reception direction of the failure notification message 102A is different from the reception direction of frame data, and therefore, it can be determined that switching of the reception direction of frame data is not necessary (step S12').

Thus, according to the ring-type communication system described above, when a failure has occurred, even without using a switching inhibition message 105, switching from the usual path to the reserve path can be carried out based on the reception direction of the failure notification message 102 that is first received and whether the other failure notification message 102 is received.

[Operations When Plural Failures Occur]

Next, in the above-described ring-type communication system, an example of operations when plural failures 101 occur will be described.

Figure 19B:
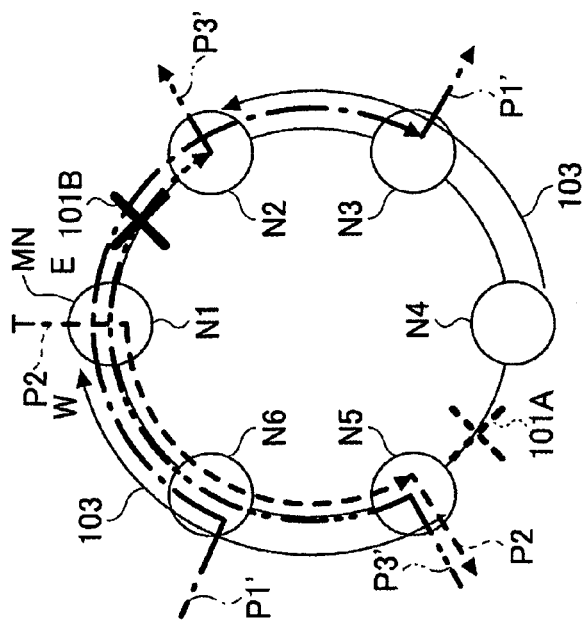
FIGS. 19A, 19B and 19C are system diagrams illustrating operations for when failures occur at plural places in the ring-type communication system in the embodiment of the present invention.
Figure 19A:
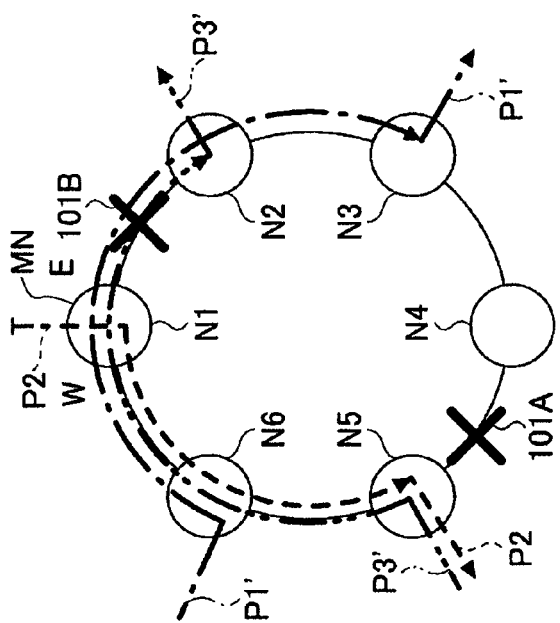
Figure 19C:
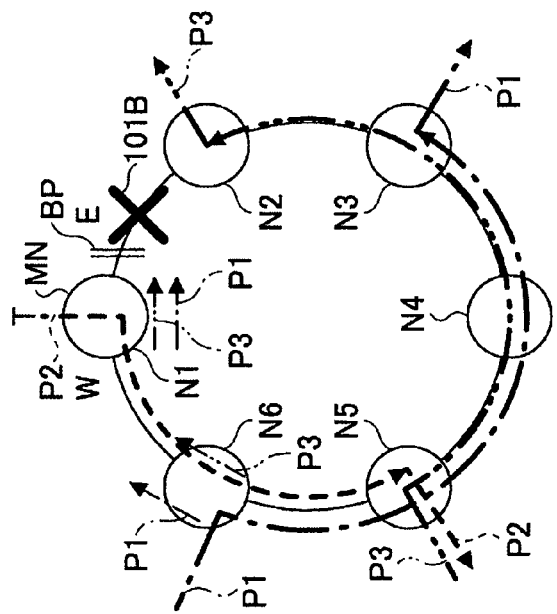

In the ring-type communication system, as depicted in FIG. 19A, it is assumed that first a failure 101A occurs between the nodes N4 and N5, and then, a failure 101B occurs between the master node N1 and the node N2.

At this time, for a usual path P2 in which a starting-point node is the master node N1 and an ending-point node is the node N5, since no failure has occurred therebetween, communications can be continued. However, in the ring-type communication system, as depicted in FIG. 19A, even after switching from the usual paths P1, P2 to the reserve paths P1', P2' based on failure notification massages 102 of the failure 101A, no communications can be carries out. In this case, even when failure notification messages 102 that report the failure 101B are received, the starting-point node and the ending-point node do not switch the reserve paths to return to the usual paths.

As depicted in FIG. 19B, after a recovery is carried out from the failure 101A, recovery notification messages 103 are transmitted from the nodes N4 and N5 to the master node N1. The recovery notification messages 103 are received by the starting-point node (node N6) and the ending-point node (node N3) of the usual path P1 and the starting-point node (node N5) and the ending-point node (node N2) of the usual path P2. It is noted that the node N5 directly detects the recovery.

At this time, the starting-point nodes carry out a process reverse to the process of determination based on the reception direction of the failure notification message 102 and the transmission direction of frame data depicted in FIG. 6. Similarly, the ending-point nodes carry out a process reverse to the process of determination based on the reception direction of the failure notification message 102 and the reception direction of frame data depicted in FIG. 6.

That is, in the starting-point node, the reception direction of the recovery notification message 103 is different from the transmission direction in the reserve path P1'. In the ending-point node, the reception direction of the recovery notification message 103 is different from the reception direction in the reserve path P1'. In this case, in FIG. 6, the starting-point node carries out the process from step S4 to step S6. On the other hand, the ending-point node carries out the process from step S11 to step S13. Thereby, the starting-point node and the ending-point node can switch from the reserve path P1' to the usual path P1.

Thus, in the ring-type communication system described above, even in the case where the plural failures have occurred, the starting-point nodes and the ending-point nodes can switch from the usual paths to the reserve paths by carrying out the communication path switching process of FIG. 6 in a case of receiving the first failure notification messages 102. Further, in the ring-type communication system, the starting-point nodes and the ending-point nodes can switch from the reserve paths to return to the usual paths by carrying out the process reverse to the process in the communication path switching process of FIG. 6 in a case of receiving the first recovery notification messages 103.

[1 To Many Communication Operations]

Next, operations when a failure occurs in a ring-type communication system that carries out communication operations of "1 to many" in which frame data received by a single starting-point node from the outside is transmitted to many end-point nodes will be described.

In the ring-type communication system, for example, as depicted in FIGS. 20A, 20B, 20C and 20D, a communication path P is set in which a node N5 functions as a starting-point node and nodes N2, N4 and N6 function as ending-point nodes. In the communication path P, the node N4 also functions as an intermediate node that relays frame data transmitted by the starting-point node.

Figure 21A:
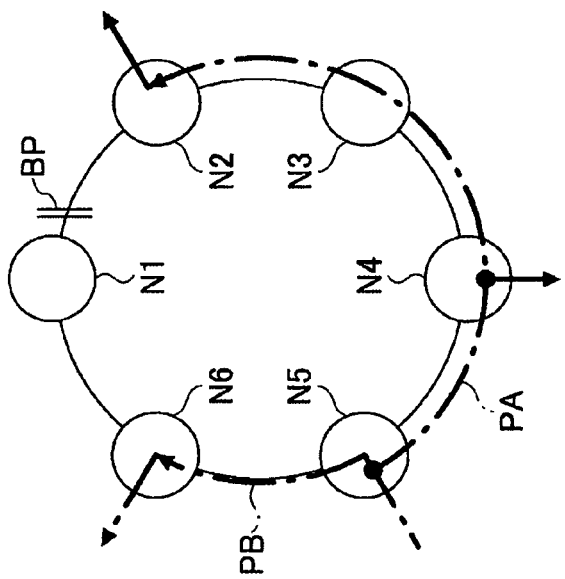
FIGS. 21A, 21B and 21C are system diagrams illustrating operations for when external data received from a single starting-point node is output from plural ending-point nodes in the ring-type communication system in the embodiment of the present invention.
Figure 21B:
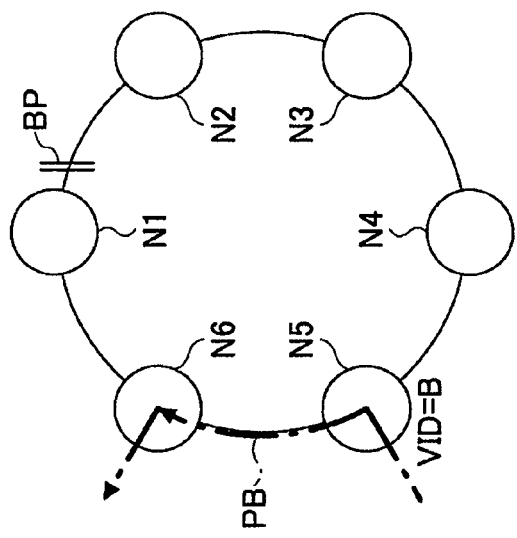
Figure 21C:
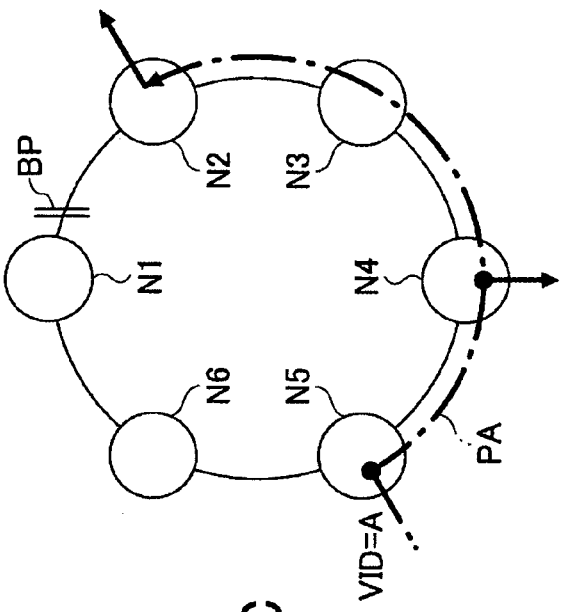

The communication path depicted in FIG. 21A includes a path PB identified by VID=B depicted in FIG. 21B, and a path PA identified by VID=A depicted in FIG. 21C. The starting-point node and the ending-point nodes in the communication path store forwarding tables that include information concerning the path PA depicted in FIG. 21C and information concerning the path PB depicted in FIG. 21B.

To the node N5 as the starting-point node, a node number '5B' of VID=B and a node number '5A' of VID=A are given. Information corresponding to the node numbers "5A" and "5B" (see FIGS. 22A and 22B) are stored as the forwarding table in the node N5. Information corresponding to a node number "4" is stored in the node N4 as the forwarding table (see FIG. 22A). Information corresponding to a node number "2" is stored in the node N2 as the forwarding table (see FIG. 22A).

Figure 20A:
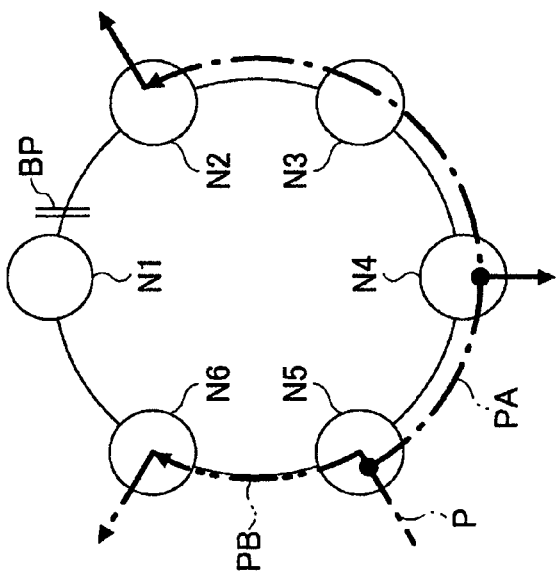
FIGS. 20A, 20B, 20C and 20D are system diagrams illustrating operations for when a failure occurs in a case where external data received from a single starting-point node is output from plural ending-point nodes in the ring-type communication system in the embodiment of the present invention.
Figure 20B:
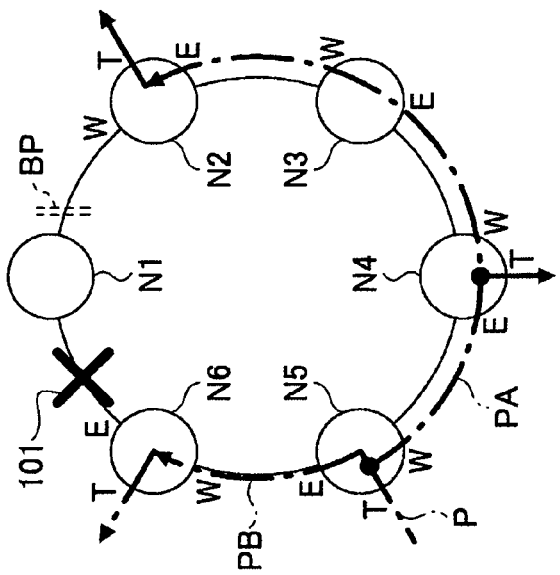
Figure 20C:
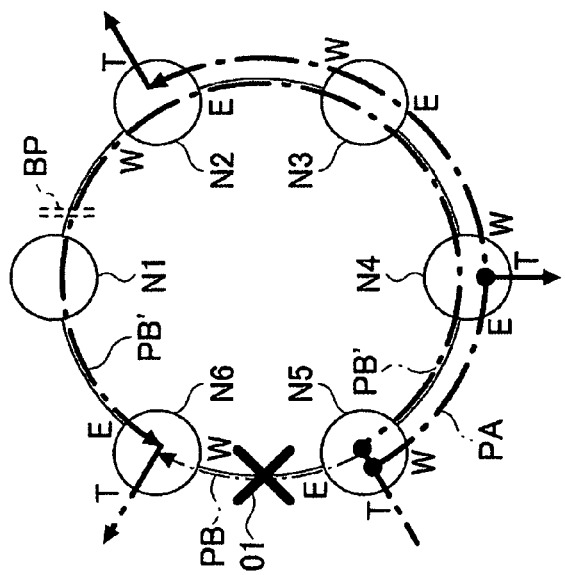
Figure 20D:
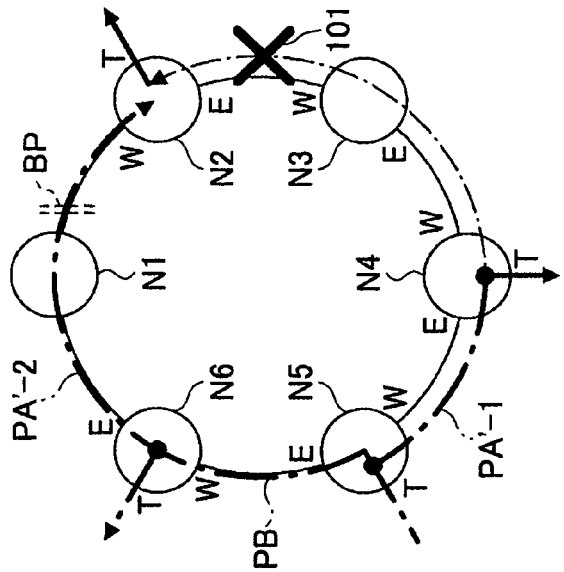

For example, as depicted in FIG. 20B, it is assumed that a failure 101 has occurred between the master node N1 and the node N6. In this case, switching to reserve paths is carried out neither from the path PA nor from the path PB. As depicted in FIG. 20C, it is assumed that a failure 101 has occurred between the nodes N5 and N6. In this case, the failure 101 has occurred in the path PB. Therefore, switching is carried out only from the path PB to a reserve path PB'. As depicted in FIG. 20D, it is assumed that a failure 101 has occurred between the nodes N2 and N3. In this case, the failure 101 has occurred in the path PA. Therefore, switching is carried out only from the path PA to a reserve path PA' (PA'-1, PA'-2).

Figure 23:
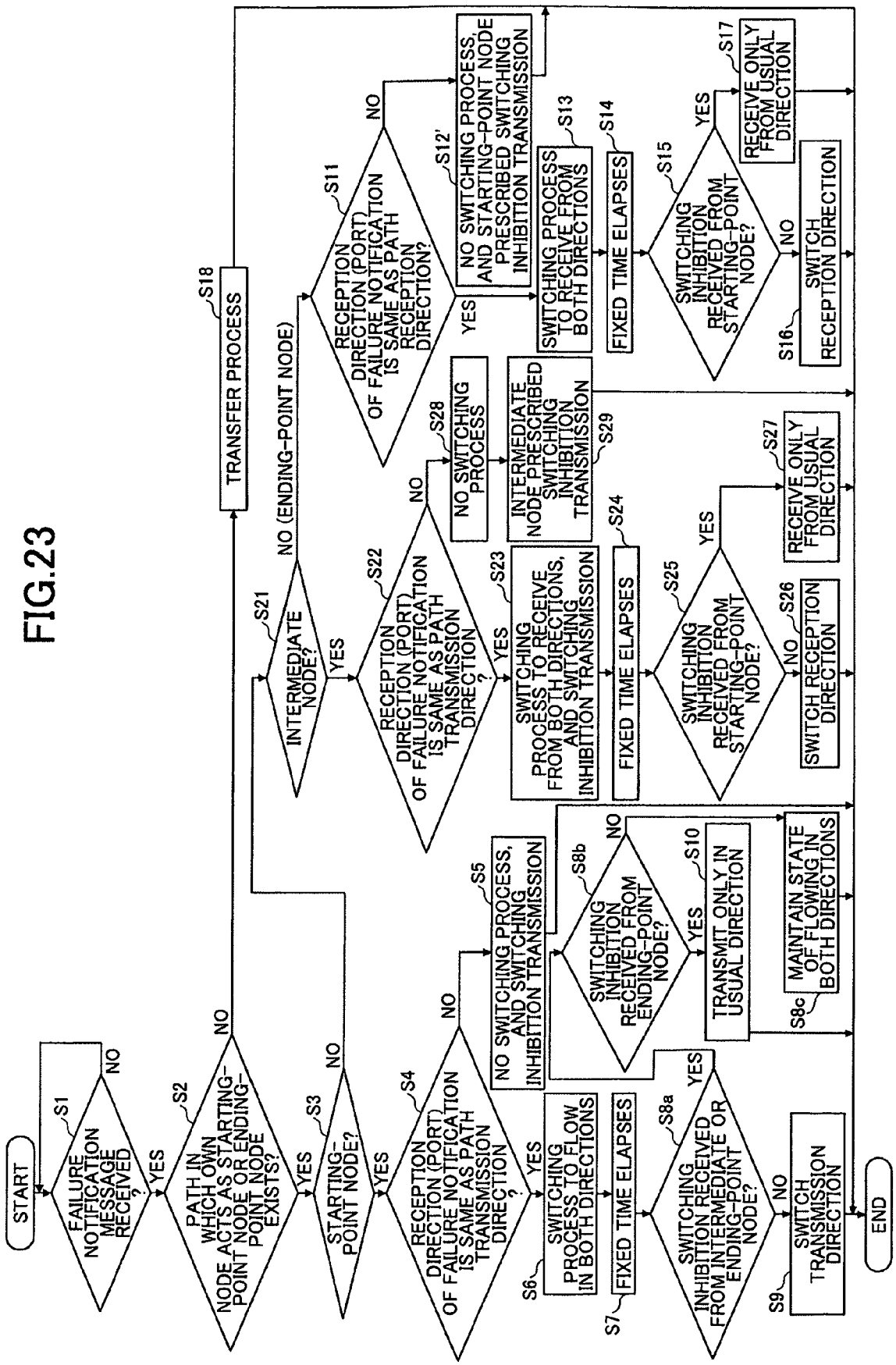
FIG. 23 illustrates a method of a process of each node for when external data received from a single starting-point node is output from plural ending-point nodes in the ring-type communication system in the embodiment of the present invention.

The node 1 in the above-described ring-type communication system carries out a communication path switching process depicted in FIG. 23.

When receiving a failure notification message 102 in step S1, the starting-point node determines YES in each of step S2 and step S3, and carries out step S4. In step S4, the starting-point node determines whether the reception direction of the failure notification message 102 is the same as the transmission direction of frame data for an ordinary occasion. In a case where the reception direction of the failure notification message 102 is different from the transmission direction of frame data for an ordinary occasion, the starring-point node does not carry out switching of the communication path in step S5. In a case where the reception direction of the failure notification message 102 is the same as the transmission direction of frame data for an ordinary occasion, the starting-point node carries out step S8a after carrying out steps S6 and S7.

In step S8a, the starting-point node determines whether it has received a switching inhibition message 105 from a node existing in the path identified by VID. In the embodiment, each node includes VID of a path to which the node belongs in a switching inhibition message 105. That is, the starting-point node determines whether it has received a switching inhibition message 105 from an intermediate node or an ending-point node of the path. In a case where the starting-point node has not received a switching inhibition message 105 from an intermediate node or an ending-point node of the path, the starting-point node carries out step S9, and switches the usual node to the reserve node.

On the other hand, in a case of having received a switching inhibition message 105 from an intermediate node or an ending-point node of the path, the starting-point node carries out step S8b. In step S8b, the starting-point node determines whether it has received the switching inhibition message 105 from an ending-point node. In a case of having received the switching inhibition message 105 from an ending-point node, the starting-point node carries out step S10, and does not change the communication path. On the other hand, in a case of not having received the switching inhibition message 105 from an ending-point node, the starting-point node carries out step S8c, and enters a state of transmitting frame data in both directions (this may be broadcast).

When an intermediate node has received a failure notification message 102 (step S1), since the intermediate node is not a starting-point node (step S3 NO, and step S21 YES), the intermediate node carries out step S22. In step S22, the intermediate node determines whether the reception direction of the failure notification message 102 is the same as the transmission direction of frame data for an ordinary occasion. In a case where the reception direction of the failure notification message 102 is the same as the transmission direction of frame data for an ordinary occasion, the intermediate node carries out step S23.

In step S23, the intermediate node is switched to a state of receiving frame data from both directions. For example, in a case where in the intermediate node, as the node N4 functioning as the intermediate node, a usual path is set such that frame data received from the E direction and is transmitted to the T direction and the W direction, the node N4 enters a state of, even when receiving frame data from the W direction, transmitting the frame data to the T direction and the W direction. Further, in step S23, the intermediate node transmits a switching inhibition message 105.

Next, in step S24, the intermediate node carries out step S25 after measuring the elapse of a fixed time period. In step S25, the intermediate node determines whether it has received a switching inhibition message 105 from a starting-point node. In a case of not having received a switching inhibition message 105 from a starting-point node, the intermediate node switches the reception direction in step S26. On the other hand, in a case of having received a switching inhibition message 105 from a starting-point node, the intermediate node receives frame data only from the direction that is set as the usual path, in step S27.

When an ending-point node has received a failure notifying message 102 (step S1), since the ending-point node is neither a starting-point node nor an intermediate node (step S3 NO and step S21 NO), the ending-point node carries out step S11. In a case where the reception direction of the failure notifying message 102 is the same as the reception direction of frame data for an ordinary occasion (step S11 YES), the ending-point node carries out a process starting from step S13, and carries out step S15. In step S15, the ending-point node determines whether it has received a switching inhibition message 105 from a starting-point node. In a case of not having received a switching inhibition message 105 from a starting-point node, the ending-point node switches the reception direction of frame data to the reserve path in step S16. On the other hand, in a case of having received a switching inhibition message 105 from a starting-point node, the ending-point node receives frame data only from the direction that is set as the usual path, in step S17

In the ring-type communication system carrying out the above-described communication path switching process, in a case where the failure 101 has occurred at a position depicted in FIG. 20B, the failure notification message 102 is transmitted from the node N6 to the node N5.

First, description will be made for the usual path PB. In the usual path PB, the node N6 provides the failure notifying message 102 to the starting-point node (node N5). Further, the ending-point node detects the failure 101 from a direction reverse to the reception direction of the usual path. In this case, the starting-point node determines YES in step S4. Further, the ending-point node determines NO in step S11, and transmits a switching inhibition message 105 in steps S12'. However, although the switching inhibition message 105 is received by the starting-point node (node N5), the starting-point node has received the switching inhibition message 105 not from an intermediate node. Therefore, the starting-point node determines YES in step S8a and YES in step S8b. Thus, the starting-point node enters a state of transmitting frame data only in the usual path. Thereby, although the failure 101 has occurred at the position depicted in FIG. 20B, the usual path PB can be maintained.

Next, description will be made for the usual path PA. Because only the node N6 transmits the failure notification message 102 to the node N5, the starting-point node (node N5) determines NO in step S4, and transmits a switching inhibition message 105. The node N4 functioning as the intermediate node determines NO in step S22, and transmits a switching inhibition message 105 without switching the path. The node N2 as an ending-point node determines YES in step S11, and receives the switching inhibition message 105 from the starting-point node in step S15. Thereby, also the ending-point node does not change the reception direction of frame data in the usual path. Therefore, although the failure 101 has occurred at the position depicted in FIG. 20B, the usual path PA can be maintained.

In the ring-type communication system carrying out the communication path switching process described above, the failure notification messages 102 are transmitted by the nodes N5 and N6 in a case where the failure 101 has occurred at a position depicted in FIG. 20C.

First, description will be made for the usual path PB. In the communication path PB, since the starting-point node (node N5) detects the failure 101 from the E direction, the starting-point node determines YES in step S4. The ending-point node detects the failure 101 from the W direction, and thus, the ending-point node determines YES in step S11. Therefore, neither the starting-point node nor the ending-point node transmits a switching inhibition message 105. In this case, the starting-point node determines NO in step S8a, and switches the transmission direction to the reserve path. Similarly, the ending-point node determines NO in step S15, and switches the reception direction to the reserve path. By the above-described process, the usual path PB can be switched to the reserve path PB'.

Next, description will be made for the usual path PA. The starting-point node (node N5) detects the failure 101 from the E direction, and thus, determines NO in step S4. The intermediate node (node N4) determines NO in step S22, and transmits a switching inhibition message 105. The ending-point node (node N2) determines YES in step S11. Thereby, none of the starting-point node and the intermediate node switches the transmission direction of frame data. The ending-point node determines YES in step S15, and receives frame data only from the reception direction in the usual path. Thereby, in the ring-type communication system, for the usual path PA, the path that transmits frame data from the node N5 to the node N2 via the node N4 can be maintained.

In the ring-type communication system carrying out the communication path switching process described above, the failure notification messages 102 are transmitted by the nodes N2 and N3 in a case where the failure 101 has occurred at a position depicted in FIG. 20D.

First, description will be made for the usual path PB. In the communication path PB, the node N3 provides the failure notification messages 102 to the starting-point node (node N5) and the ending-point node (node N6). In this case, the starting-point node determines NO in step S4, and transmits a switching inhibition message 105. Further, the ending-point node determines YES in step S11, however, the ending-point node receives the switching inhibition message 105 from the starting-point node, and thus, the ending-point node determines YES in step S15. Therefore, neither the starting-point node nor the ending-point node switches to the reserve path PB'.

Next, description will be made for the usual path PA. Since the failure notification message 102 is transmitted from the node N3, the starting-point node (node N5) determines YES in step S4. Further, the intermediate node (node N4) determines YES in step S22, and transmits a switching inhibition message 105. The ending-point node (node N2) detects the failure 101 from the E direction, and thus, determines YES in step S11.

In this state, the switching inhibition message 105 is transmitted only from the intermediate node. Therefore, the starting-point node determines YES in step S8a, determines NO in step S8b, and thus, enters a state of transmitting frame data in both directions (this may be broadcast). Further, the intermediate node determines NO in step S25, and thus, as depicted in FIG. 22A, the intermediate node receives frame data from both directions and transmits the frame data in the T direction as the reserve path. The ending-point node determines NO in step S15, and enters a state of transmitting frame data received from the W direction to the T direction as the reserve path. Thereby, as depicted in FIG. 20D, the usual path is separated into the reserve path PA'-1 and the reserve path PA'-2.

Thus, even in the so-called point-to-multipoint-type ring-type communication system, it is possible to switch, for an occasion where a failure has occurred, from the usual path to the reserve path according to the relationship between the reception direction of the failure notification message 102 and the transmission direction or the reception direction of frame data for an ordinary occasion.

[Plural-Ring Configuration]

Next, a ring-type communication system having plural ring-type communication paths including a common path at a part will be described.

Figure 24A:
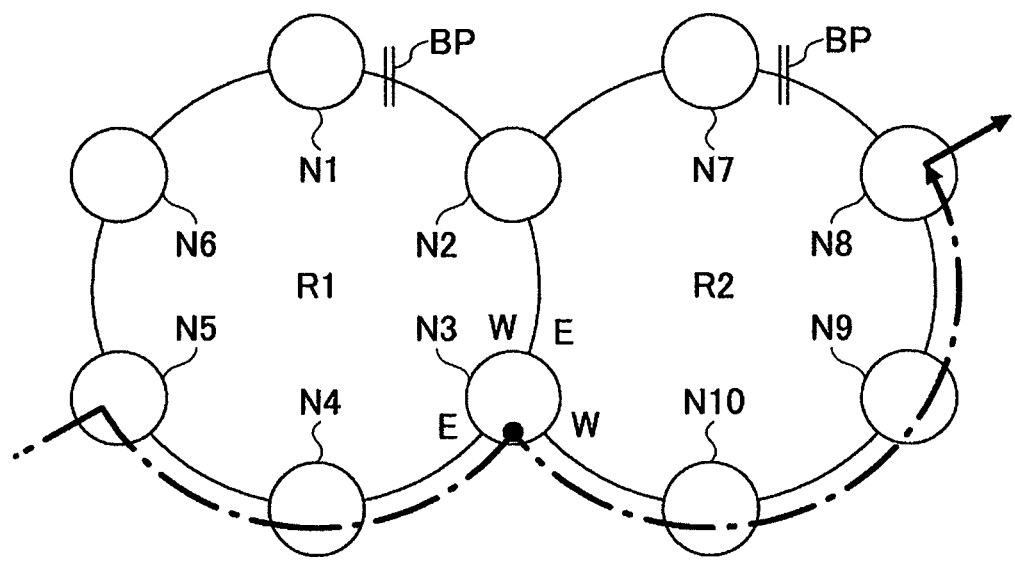
FIGS. 24A and 24B are system diagrams illustrating operations of a system in which plural ring-type networks are connected together in the ring-type communication system in the embodiment of the present invention.

The ring-type communication system has, as depicted in FIG. 24A, a ring R1 and a ring R2, having a common communication path that connects the nodes N2 and N3 together. In this ring-type communication system, a usual path is such that a node N5 functions as a starting-point node and a node N8 functions as an ending-point node. Further, in the usual path, a node N3 connects the ring R1 and the ring R2 together.

Figure 24B:
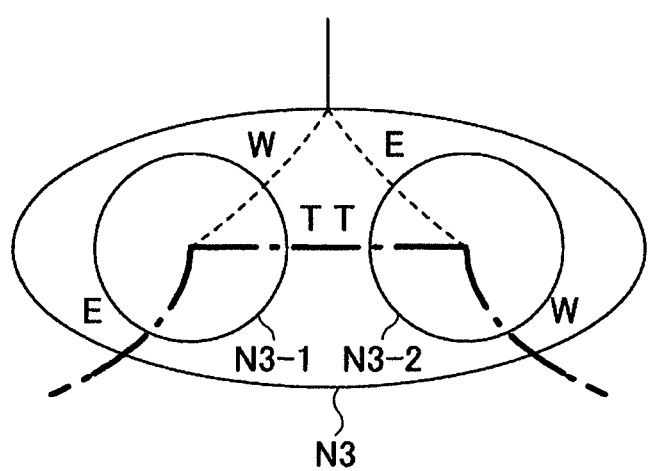

The node N3 includes, as depicted in FIG. 24B, a switch part N3-1 connected to the ring R1 and the node N2, and a switch part N3-2 connected to the ring R2 and the node N2. The node N3 functions as a starting-point node and functions as an ending-point node when viewed from the rings R2 and R1, respectively. For example, in a case where frame data is transmitted from the node N5 to the node N8, the node N3 functions as the ending-point node when being viewed from the ring R1, and functions as the starting-point node when being viewed from the ring R2

Figure 25A:
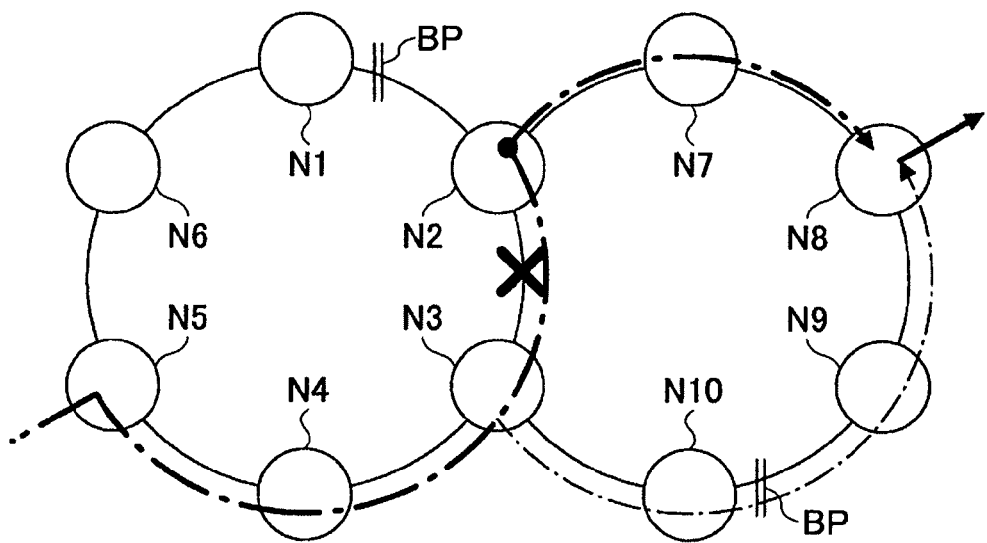
FIGS. 25A and 25B are system diagrams illustrating a protection method in a ring-type network.
Figure 25B:
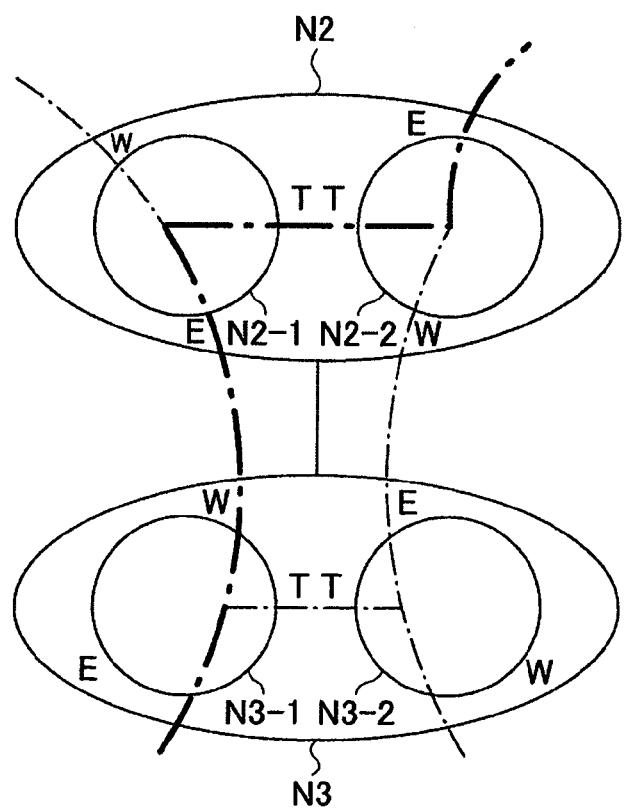
Figure 26B:
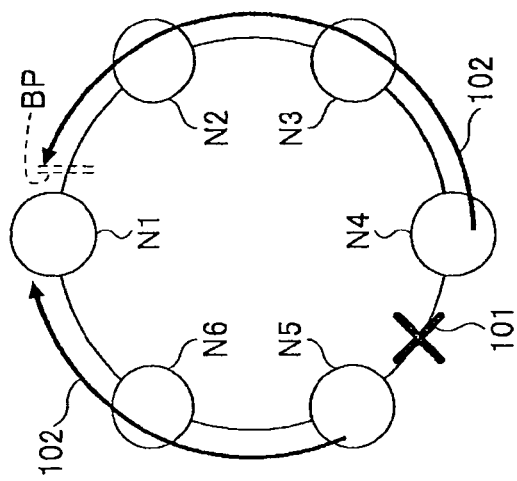
FIGS. 26A, 26B, 26C and 26D are system diagrams illustrating a problem in the related art.
Figure 26D:
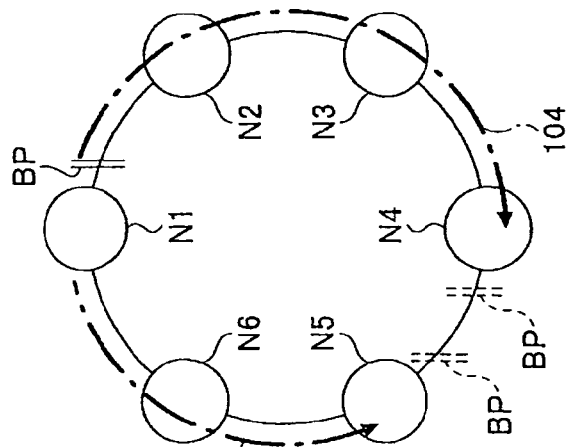
Figure 26A:
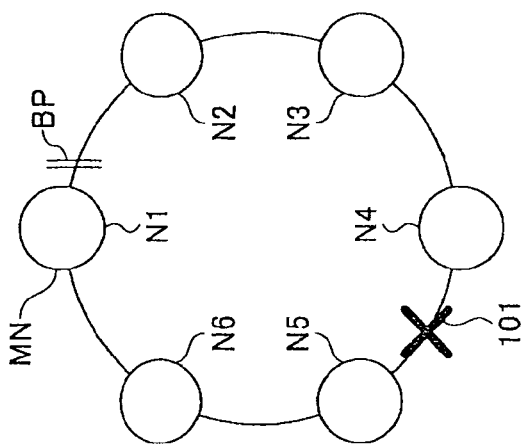
Figure 26C:
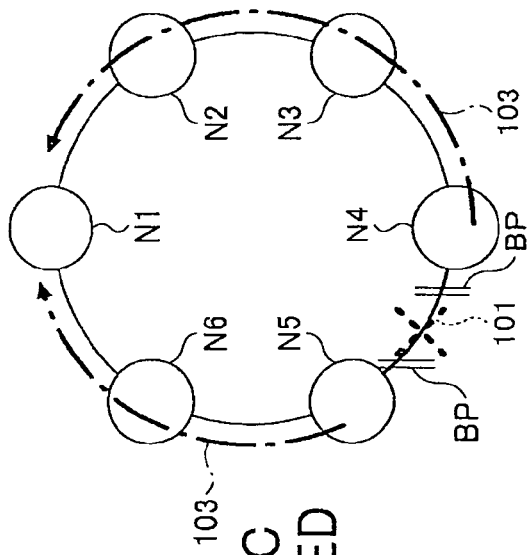

In the ring-type communication system, priority is set for the rings R1 and R2. For example, in a case where the priority of the ring R1 is higher, as depicted in FIG. 25A, a blocking port BP for the ring R1 is provided to the master node N1, and a blocking port BP for the ring R2 is provided to the master node N10 of the ring R2. Further, the node N2 near to the master node N1 functions as a connection point between the rings R1 and R2. In this case, a usual path in which the node N5 functions as the starting-point node and the node N8 functions as the ending-point node is a path that passes through the nodes N5, N2 and N8. At this time, frame data is transmitted to the ring R2 via the switch part N3-1 of the node N3, and switch parts N2-1 and N2-2 of the node N2, as depicted in FIG. 25B.

In the ring-type communication system, it is assumed that a failure 101 has occurred between the nodes N3 and N2. At this time, the nodes N2 and N3 transmit failure notification messages 102 to the master nodes N1 and N10. Since the priority of the ring R1 is higher, the path in the ring R1 is not changed, while the path in the ring R2 is changed.

The node N3 functions as the starting-point node of the ring R2 for the ring R1. Therefore, in the communication path switching process of FIG. 6, the node N3 determines YES in each of steps S3 and S4, and switches the transmission direction of frame data in step S9. Further, in the node N8 as the ending-point node, since the reception direction of the failure notification message 102 transmitted by the node N2 is the same as the reception direction of frame data for an ordinary occasion, the reception direction of frame data is switched in step S16.

Thereby, according to the multi-ring-type ring-type communication system in which the plural rings are connected together, switching to the reserve path can be appropriately carried out based on the priority set for each ring and the reception direction of the failure notification message 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment(s) of the present inventions have been described in detail, it should be understood that various changes, substitutions, and alterations could be made hereto without departing from the spirit and scope of the invention.

What is claimed is:

1. A data relay apparatus that carries out data relay in a ring communication network in which data that includes a path identifier and is transferred according to the path identifier exists, comprising:
   a receiving part that receives the data;
   an information storing part that stores the path identifier in association with a reception direction and a transmission direction of the data and information indicating whether a data path determined by the path identifier, in which the data is transferred in the ring communication network, is a usual path for an ordinary occasion and a reserve path for an occasion of a communication failure;
   a switching part that compares the path identifier included in the received data and the path identifier stored by the information storing part, determines a path in which the data is to be received and transmitted and switches the transmission direction of the data between a transmission direction of the usual path and a transmission direction of the reserve path based on a reception direction of a failure notification message that is received when the communication failure occurs and whether a switching inhibition message that is transmitted concerning the communication failure is received; and
   a transmission part that transmits the data in the transmission direction that is switched by the switching part,
   wherein the switching part compares the reception direction of the failure notification message and a previously set transmission direction of the data stored in the information storing part, and switches the transmission direction of the data based on a result of the comparison and on whether the switching inhibition message is received.

2. The data relay apparatus as claimed in claim 1, which functions as a starting point from which an external data is transmitted to the ring communication network, which external data has been transmitted from an outside of the ring communication network, wherein:
   in a case where the failure notification message is received, the switching part switches or maintains the transmission direction of the external data based on a relationship among the reception direction of the failure notification message, whether the switching inhibition message is received, and the transmission direction of the usual path.

3. The data relay apparatus as claimed in claim 1, which functions as an ending point from which an internal data is transmitted to an outside of the ring communication network, which internal data has been transmitted from an inside of the ring communication network, wherein:
   in the information storing part, a reception direction of the internal data for the ordinary occasion and a reception direction of the internal data for the occasion of the communication failure are stored for each path identifier, and
   in a case where the failure notification message is received, the switching part switches or maintains the reception direction of the internal data based on a relationship among the reception direction of the failure notification message, whether the switching inhibition message is received, and the reception direction of the internal data for the ordinary occasion.

4. The data relay apparatus as claimed in claim 1 in the ring communication network in which a block point is provided at a part of a ring communication path for avoiding a loop of the data, and, when the communication failure occurs, a re-setting notification message is transmitted and a state in which the block point is opened is provided, wherein:
   when receiving the re-setting notification message transmitted by a relay apparatus that sets the block point, the switching part switches or maintains a transmission direction of external data or a reception direction of internal data based on a relationship between a reception direction of the re-setting notification message and a current transmission direction of the external data or a current reception direction of the internal data.

5. The data relay apparatus as claimed in claim 1, wherein:
   when the communication failure occurs,
   in a case of receiving a first failure notification message from a data relay apparatus at one end which detects the communication failure, the switching part switches or maintains a transmission direction of external data for the ordinary occasion or a reception direction of internal data for the ordinary occasion, based on a relationship between a reception direction of the first failure notification message and the transmission direction of the external data for the ordinary occasion or the reception direction of the internal data for the ordinary occasion, and whether a second failure notification message transmitted from a data relay apparatus at another end which detects the communication failure is received.

6. The data relay apparatus as claimed in claim 1 included in the ring communication network in which, in a case where a recovery from the communication failure is detected, a recovery notification message is transmitted from a relay apparatus that has detected the recovery, wherein:
   in a case where plural communication failures occur and plural of the failure notification messages are transmitted,
   the switching part switches or maintains a transmission direction of external data for the ordinary occasion or a reception direction of internal data for the ordinary occasion based on the failure notification message that is first received, and
   the switching part switches to return the transmission direction of the external data or the reception direction of the internal data based on a recovery notification message that is first received.

7. The data relay apparatus as claimed in claim 1 which relays the data transmitted from an inside of the ring communication network to an adjacent relay apparatus based on a first path identifier, and functions as a starting point from which external data transmitted from an outside of the ring communication network is transmitted to an inside of the ring communication network or an ending point from which internal data transmitted from the inside of the ring communication network is transmitted to the outside of the ring communication network based on a second path identifier, wherein:
   in the information storing part, a reception direction and a transmission direction of the data are stored in association with the first path identifier, and a transmission direction of the external data for the ordinary occasion and a transmission direction of the external data for the occasion of the communication failure, or a reception direction of the internal data for an ordinary occasion and a reception direction of the internal data for the occasion of the communication failure are stored in association with the second path identifier, and
   in a case of receiving the failure notification message, the switching part switches the transmission direction of the external data for the ordinary occasion or the reception direction of the internal data for the ordinary occasion based on a relationship between a reception direction of the failure notification message and the reception direction or the transmission direction associated with the second path identifier.

8. The data relay apparatus as claimed in claim 1, wherein:
the ring communication network has plural ring communication paths including a common communication path at a part, and priority is set for each of the ring communication paths, and
when the communication failure occurs in the common communication path, in a case where the relay apparatus belongs to the ring communication path having low priority, the switching part switches a transmission direction of external data for the ordinary occasion or a reception direction of internal data for the ordinary occasion based on the failure notification message.

9. A ring communication system, comprising:
a data relay apparatus that carries out data relay in a ring communication network in which data that includes a path identifier and is transferred according to the path identifier exists, wherein the data relay apparatus includes
a receiving part that receives the data;
an information storing part that stores the path identifier in association with a reception direction and a transmission direction of the data and information indicating whether a data path determined by the path identifier, in which the data is transferred in the ring communication network, is a usual path for an ordinary occasion and a reserve path for an occasion of a communication failure;
a switching part that compares the path identifier included in the received data and the path identifier stored by the information storing part, determines a path in which the data is to be received and transmitted and switches the transmission direction of the data between a transmission direction of the usual path and a transmission direction of the reserve path based on a reception direction of a failure notification message that is received when the communication failure occurs and whether a switching inhibition message that is transmitted concerning the communication failure is received; and
a transmission part that transmits the data in the transmission direction that is switched by the switching part,
wherein the switching part compares the reception direction of the failure notification message and a previously set transmission direction of the data stored in the information storing part, and switches the transmission direction of the data based on a result of the comparison and on whether the switching inhibition message is received.

10. A ring communication system, comprising:
a starting-point node that functions as a starting point in a ring communication path and transmits externally received external data to an inside of the ring communication path, and when a communication failure occurs, compares a reception direction of a failure notification message and a previously set transmission direction of the external data and switches a transmission direction of the external data based on a result of the comparison by the starting-point node and on whether a switching inhibition message transmitted concerning the communication failure is received; and
an ending-point node that functions as an ending point in the ring communication path and transmits internal data to an outside, and when receiving the failure notification message, compares a reception direction of the failure notification message and a previously set reception direction of the internal data and switches a reception direction of the internal data based on a result of the comparison by the ending-point node and on whether the switching inhibition message is received.

11. The ring communication system as claimed in claim 10, wherein:
at a time of a recovery from the communication failure, a master node transmits a re-setting notification message to set a block point again,
the starting-point node switches the transmission direction of the external data based on a relationship between a reception direction of the re-setting notification message and the previously set transmission direction of the external data, and
the ending-point node switches the reception direction of the internal data based on a relationship between a reception direction of the re-setting notification message and the previously set reception direction of the internal data.

* * * * *